US010996519B2

(12) United States Patent
Shiina

(10) Patent No.: US 10,996,519 B2
(45) Date of Patent: May 4, 2021

(54) DISPLAY DEVICE

(71) Applicant: Japan Display Inc., Tokyo (JP)

(72) Inventor: Hideki Shiina, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 16/269,079

(22) Filed: Feb. 6, 2019

(65) Prior Publication Data

US 2019/0243173 A1 Aug. 8, 2019

(30) Foreign Application Priority Data

Feb. 7, 2018 (JP) .............................. JP2018-020114

(51) Int. Cl.
*G02F 1/1333* (2006.01)
*G06F 3/041* (2006.01)
*G02F 1/1343* (2006.01)
*G02F 1/1335* (2006.01)
*G02F 1/1362* (2006.01)
*G06F 3/044* (2006.01)

(52) U.S. Cl.
CPC ........ *G02F 1/1343* (2013.01); *G02F 1/13338* (2013.01); *G02F 1/133345* (2013.01); *G02F 1/133512* (2013.01); *G02F 1/136286* (2013.01); *G06F 3/0412* (2013.01); *G06F 3/0443* (2019.05); *G06F 3/04164* (2019.05); *G02F 1/134372* (2021.01)

(58) Field of Classification Search
CPC ..... G02F 1/13338; G02F 2001/134372; G02F 1/134372; G06F 3/04164; G06F 3/0443; G06F 3/0448; G06F 2203/04111
See application file for complete search history.

(56) References Cited

U.S. PATENT DOCUMENTS

2015/0177880 A1 6/2015 Shin et al.
2017/0293191 A1* 10/2017 Tomioka ............. H01L 27/1262
2018/0348584 A1* 12/2018 Wu .................... G02F 1/136286

FOREIGN PATENT DOCUMENTS

JP    2015-122057 A    7/2015

* cited by examiner

*Primary Examiner* — Angela K Davison
(74) *Attorney, Agent, or Firm* — Xsensus LLP

(57) ABSTRACT

According to one embodiment, a display device includes a first drain electrode, a first insulating film which is organic, a first metal electrode in contact with the first drain electrode in a first through-hole of the first insulating film, a second insulating film which is organic, a first transparent electrode in contact with the first metal electrode in a second through-hole of the second insulating film and formed of a transparent conductive material, a third insulating film which is inorganic, a pixel electrode in contact with the first transparent electrode in a third through-hole of the third insulating film and a metal wire located between the first insulating film and the second insulating film and formed of a material identical to that of the first metal electrode.

19 Claims, 21 Drawing Sheets

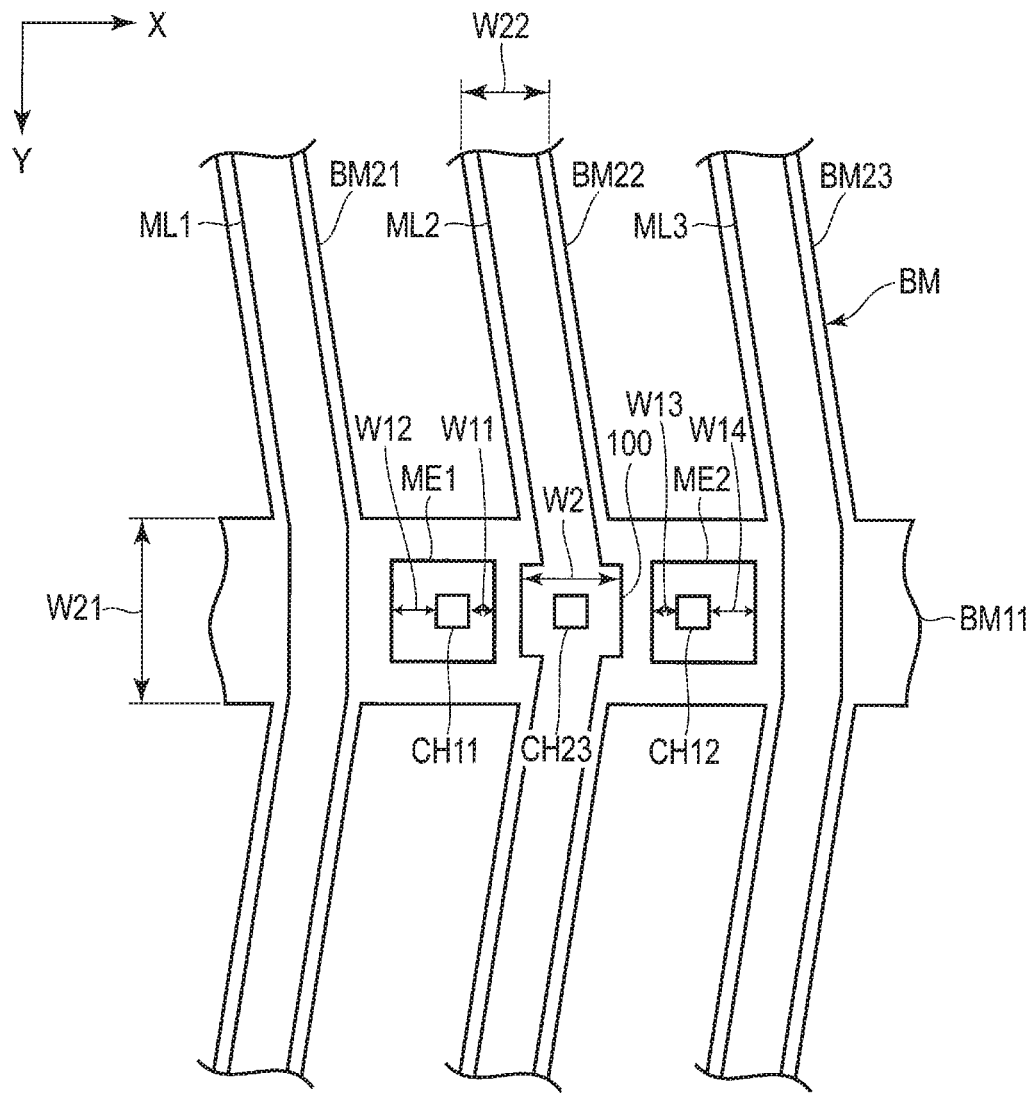
F I G. 10

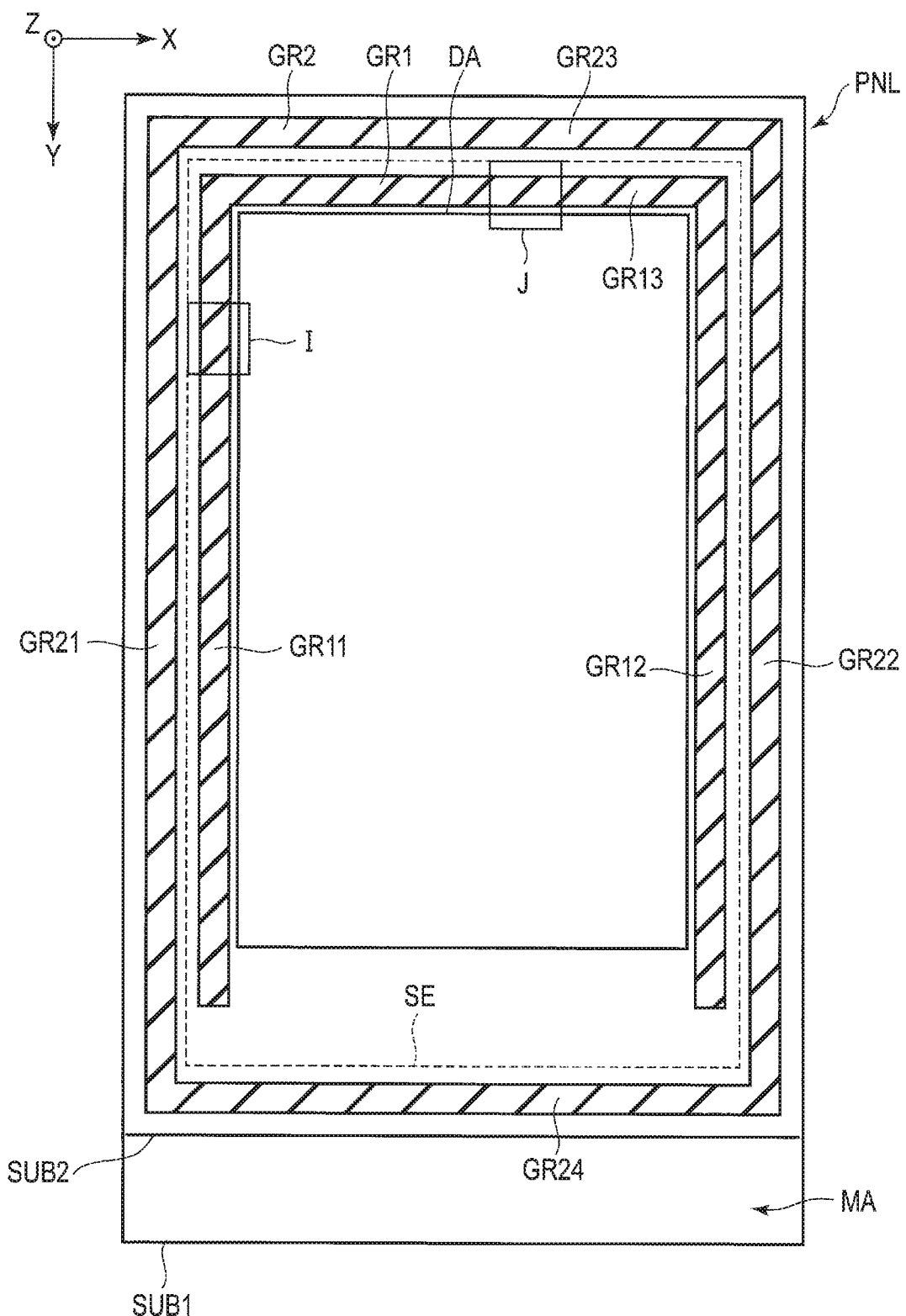
F I G. 13

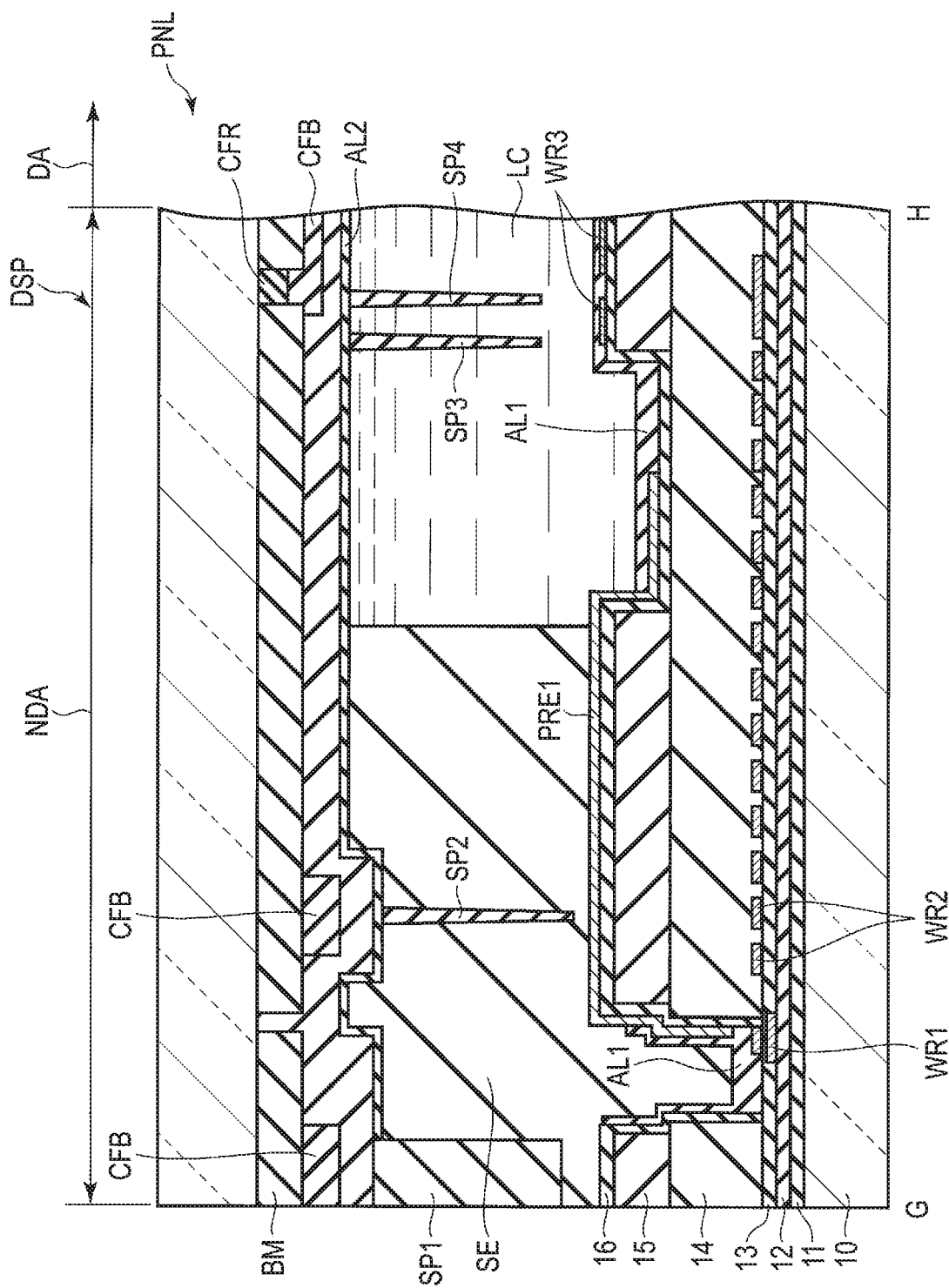
F I G. 14

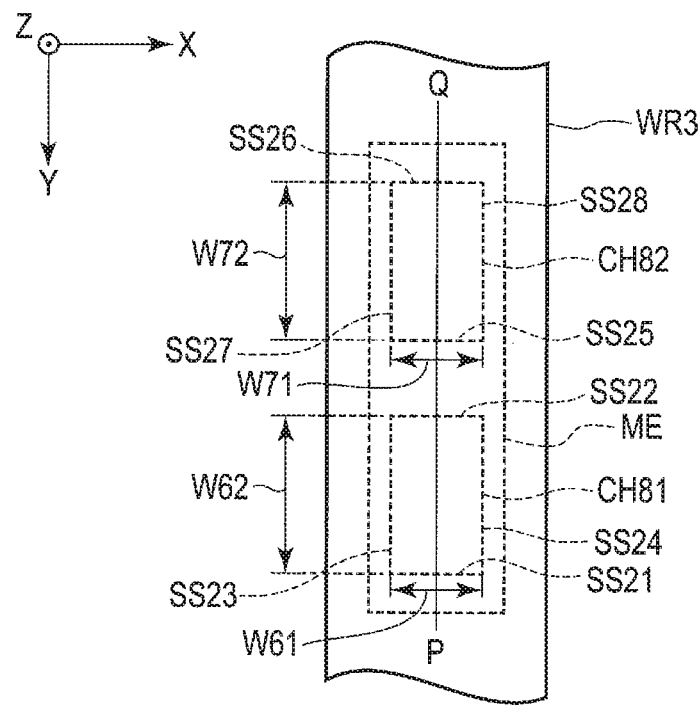
F I G. 21
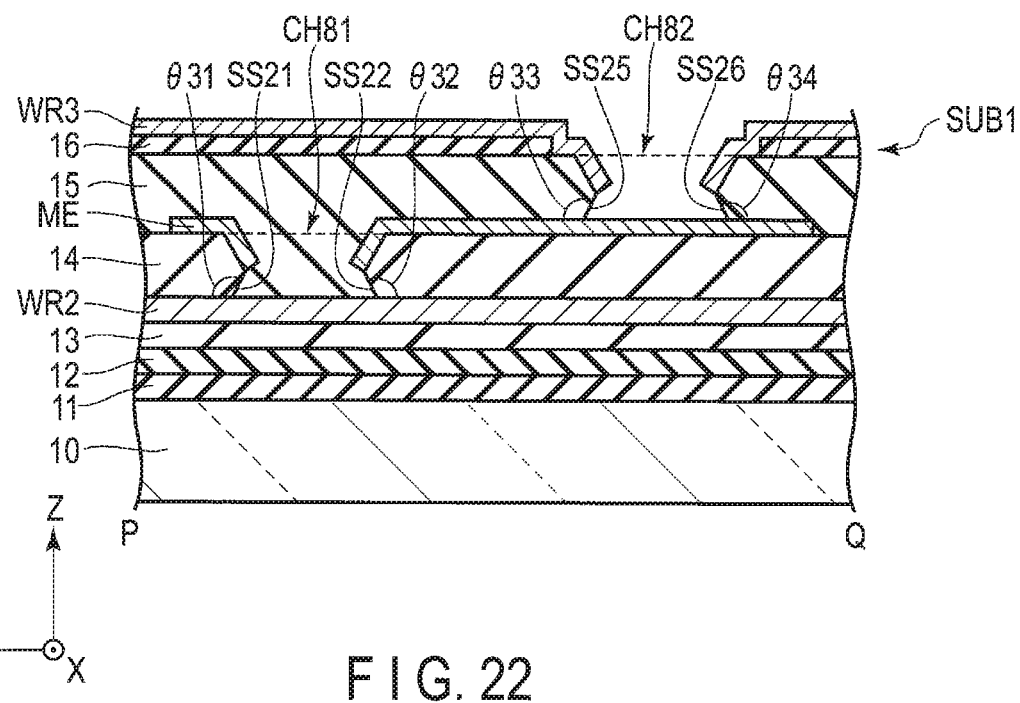
F I G. 22

DISPLAY DEVICE

CROSS-REFERENCE TO RELATED APPLICATIONS

This application is based upon and claims the benefit of priority from Japanese Patent Application No. 2018-020114, filed Feb. 7, 2018, the entire contents of which are incorporated herein by reference.

FIELD

Embodiments described herein relate generally to a display device.

BACKGROUND

In recent years, various types of display devices containing a touch sensor built therein are proposed. For example, such a display device is disclosed, that when a plurality of electrodes formed in the display panel are in a touch-sensing mode, they function as sensor electrodes, whereas when in a display mode, they function as common electrodes. As the touch-sensing mode, either a mutual capacitance mode or a self-capacitance mode is applied. In the touch-sensing mode, sensing is performed by applying touch drive voltage to a sensor electrode through a signal line.

BRIEF DESCRIPTION OF THE DRAWINGS

FIG. 10 is a plan view showing positions of a light-shielding layer, metallic wiring lines, a first metal electrode, and a second metal electrode, which correspond to the pixel layout shown in FIG. 9.

FIG. 13 is a plan view showing a position of a groove portion shown in FIG. 12.

FIG. 14 is a cross section showing a modified example of a display panel according to the second embodiment shown in FIG. 12.

FIG. 21 is a plan view showing a comparative example of a peripheral wire in the region U in FIG. 16.

FIG. 22 is a cross-sectional view of the first substrate SUB1 taken along line P-Q in FIG. 21.

DETAILED DESCRIPTION

Figure 1:
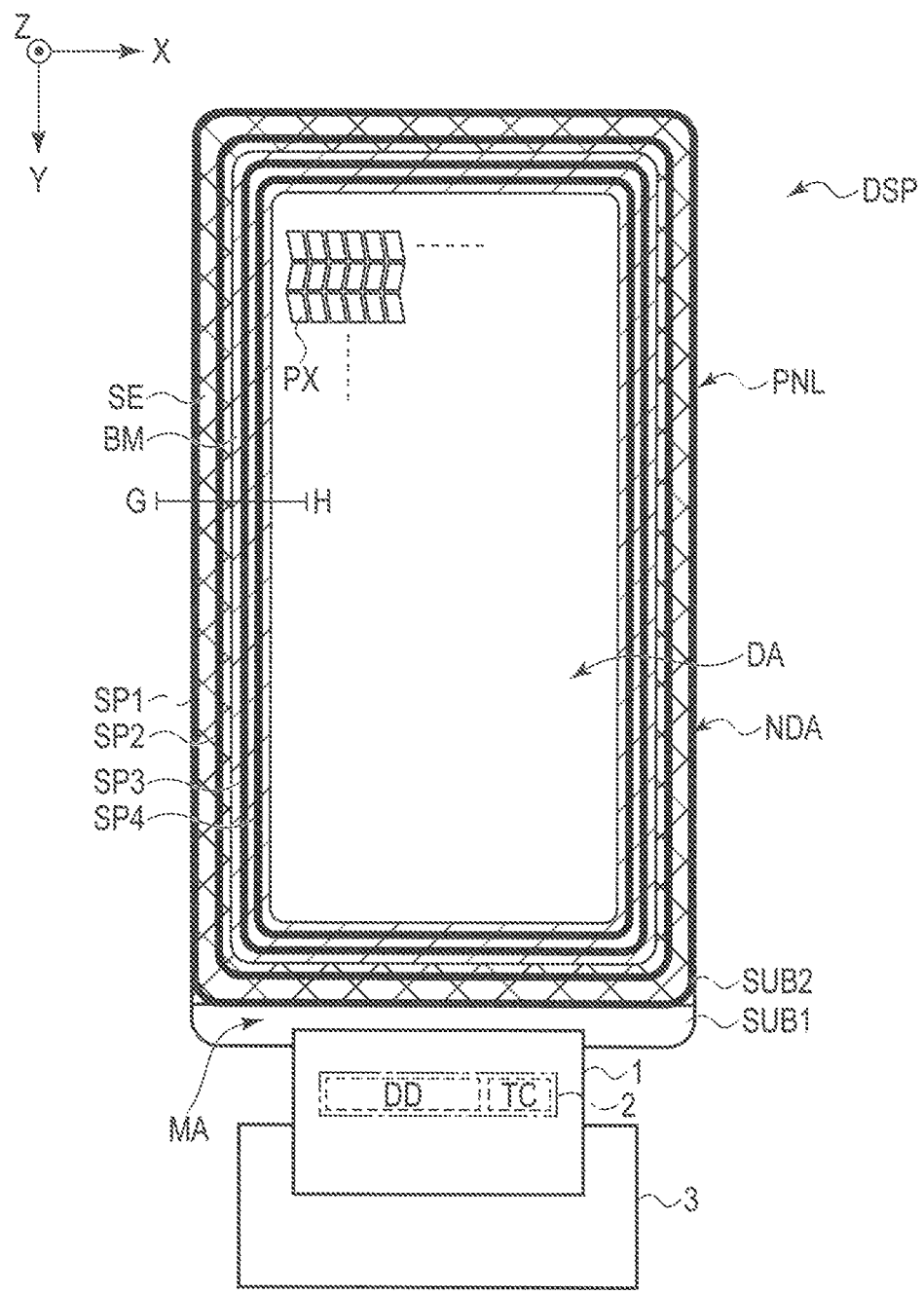
FIG. 1 is a plan view showing an appearance of a display device of each of the first to third embodiments.

In general, according to one embodiment, a display device comprises a switching element comprising a first drain electrode, a first insulating film comprising a first through-hole penetrating to the first drain electrode and formed of an organic insulating material, a first metal electrode in contact with the first drain electrode in the first through-hole and formed of a metal material, a second insulating film located on the first insulating film, comprising a second through-hole penetrating to the first metal electrode, and formed of an organic insulating material, a first transparent electrode in contact with the first metal electrode in the second through-hole and formed of a transparent conductive material, a third insulating film located on the second insulating film, including a third through-hole penetrating to the first transparent electrode and formed of an inorganic insulating material, a pixel electrode located on the third insulating film and in contact with the first transparent electrode in the third through-hole and a metal wire located between the first insulating film and the second insulating film and formed of a material identical to that of the first metal electrode.

The embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. In addition, in some cases, in order to make the description clearer, the widths, thicknesses, shapes, etc., of the respective parts are schematically illustrated in the drawings and compared to the actual modes. However, the schematic illustration is merely an example, and adds no restrictions to the interpretation of the invention. In addition, in the specification and drawings, the structural elements, which have functions identical or similar to the functions described in connection with preceding drawings, are denoted by like reference numbers, and an overlapping detailed description thereof is omitted unless otherwise necessary.

First, a display device DSP of each of the first to third embodiments will be described in detail. In the first to third embodiments, a liquid crystal display device is explained as an example of the display device.

FIG. 1 is a plan view showing an appearance of a display device DSP of each of the first to third embodiments.

For example, a first direction X, a second direction Y and a third direction Z are orthogonal to each other, but they may cross each other at an angle other than 90°. The first direction X and the second direction Y correspond to a direction parallel to the main surface of the substrate which constitutes the display device DSP, and the third direction Z corresponds to a thickness direction of the display device DSP. In this specification, the direction towards a distal end an arrow indicating the third direction Z is referred to as "above" (or merely "up"), and the direction towards opposite from the distal end of the arrow is referred to as "below" (or merely "down"). Further, an observation position where the display device DSP is observed is set on an distal end side of the arrow which indicates the third direction Z, and plan view is defined as a view from this observation position toward an X-Y plane defined by the first direction X and the second direction Y.

Here, a plan view of the display device DSP in the X-Y plane is shown. The display device DSP comprises a display panel PNL, a flexible printed circuit 1, an IC chip 2 and a circuit board 3.

The display panel PNL is a liquid crystal display panel, which comprises a first substrate SUB1, a second substrate SUB2, a sealing material SE, a light-shielding layer BM, spacers SP1 to SP4 and a liquid crystal layer LC, which will be described later. The display panel PNL includes a display area DA which displays images and a frame-like non-display area NDA which surrounds the display area DA. The second substrate SUB2 opposes the first substrate SUB1. The first substrate SUB1 includes a mounting portion MT extending in the second direction Y further from the second substrate SUB2.

The sealing material SE is provided in the non-display area NDA so as to adhere the first substrate SUB1 and the second substrate SUB2 to each other. The light-shielding layer BM is located in the non-display area NDA. The sealing material SE is provided in a position overlapping the light-shielding layer BM in plan view. In FIG. 1, the region where the sealing material SE is provided and the region where the light-shielding layer BM is provided are illustrated by slashes different from each other and the region where the sealing material SE and the light shielding layer BM overlap each other is illustrated by cross-hatching. The light-shielding layer BM is provided on the second substrate SUB2.

The spacers SP1 to SP4 are all located in the non-display area NDA. The spacer SP1 is located in the outermost circumference of the display panel PNL. The spacer SP2 is located on a display area DA side with respect to the spacer SP1. The spacers SP1 and SP2 overlap the sealing material SE. The spacers SP3 and SP4 are located on the display area DA side with respect to the sealing material SE. The spacers SP1 to SP4 are formed, for example, on the second substrate SUB2, but they may be provided on the first substrate SUB1.

The display area DA is located on an inner side surrounded by the light-shielding layer BM. The display area DA comprises, for example, a plurality of pixels PX arranged in a matrix along the first direction X and the second direction Y.

The flexible printed circuit 1 is mounted on the mounting portion MA, and is connected to the circuit board 3. The IC chip 2 is mounted on the flexible printed circuit 1. Note that the IC chip 2 may be mounted on the mounting portion MA. The IC chip 1 comprises a built-in display driver DD, which outputs signals necessary to display images in a display mode for displaying images. Moreover, in the example illustrated, the IC chip 2 contains a built-in touch controller TC which controls a touch sensing mode detecting approaching or contact of an object to the display device DSP. In the figures, the IC chip 2 is indicated by an alternate long and short dash line, whereas the display driver DD and the touch controller TC are indicated by dotted lines.

The display panel PNL of this embodiment may be any of a transmissive type comprising a transmissive display function which displays images by selectively transmitting light from a rear surface side of the first substrate SUB1, a reflective type comprising a reflective display function which displays images by selectively reflecting light from a front surface side of the second substrate SUB2 and a trans-reflective type comprising both of the transmissive display function and the reflective display function.

An explanation of the detailed structure of the display panel PNL is omitted here, but the display panel PNL may have a structure provided for a display mode which uses a lateral electric field along a main surface of the substrate, a display mode which uses a vertical electric field along a normal of the main surface of the substrate, a display mode which uses an inclined electric field inclined in an oblique direction to the main surface of the substrate, and also a display mode which uses the lateral electric field, the vertical electric field and the inclined electric field in an appropriate combination. Here, the main surface of the substrate is a surface parallel to the X-Y plane defined by the first direction X and the second direction Y.

Figure 2:
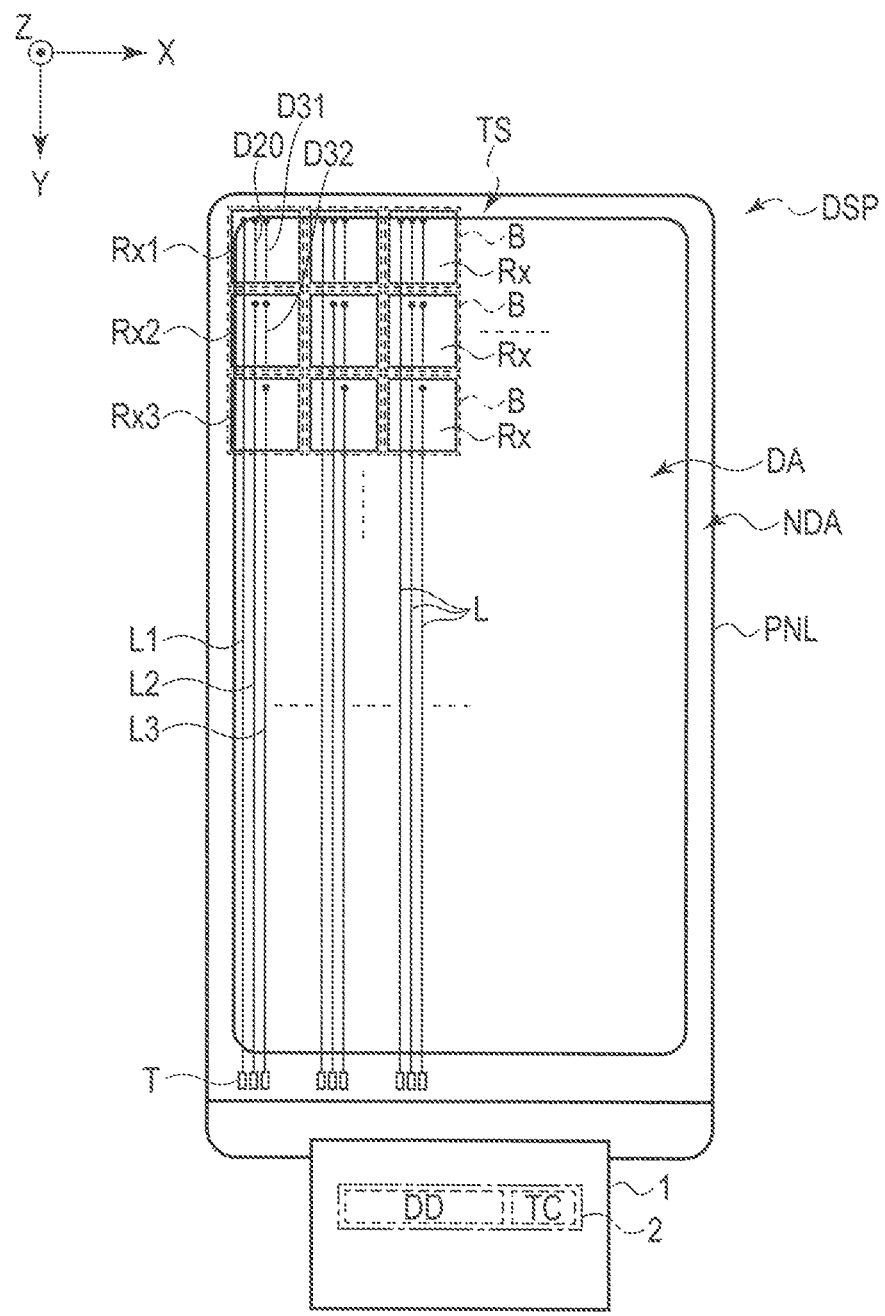
FIG. 2 is a plan view showing a configuration example of a touch sensor.

FIG. 2 is a plan view showing a configuration example of a touch sensor TS. Here, a self-capacitive touch sensor TS will be described, but the touch sensor TS may be of a mutual capacitive mode.

The touch sensor TS comprises a plurality of sensor electrodes Rx (Rx1, Rx2, . . . ) arranged in a matrix and a plurality of sensor wiring lines L (L1, L2 . . . ). The plurality of sensor electrodes Rx are located in the display area DA and arranged in the matrix along the first direction X and the second direction Y. One sensor electrode Rx constitutes one sensor block B. A sensor block B is the minimum unit in which touch sensing can be performed. The plurality of sensor wiring lines L, in the display area DA, each extend along the second direction Y, and are arranged along the first direction X. Each of the sensor wiring lines L is provided in the position overlapping, for example, a respective signal line S, which will be described later. Moreover, each of the sensor wiring lines L is drawn to the non-display area NDA, and is electrically connected to the IC chip 2 via the flexible printed circuit 1. The sensor wiring lines L each comprise a terminal portion T in the non-display area NDA.

Here, the relationship between sensor wiring lines L1 to L3 arranged along the first direction X and sensor electrodes Rx1 to Rx3 arranged along in the second direction Y will be focused. The sensor wiring line L1 overlaps the sensor electrodes Rx1 to Rx3, and is electrically connected to the sensor electrode Rx1.

The sensor wiring line L2 overlaps the sensor electrodes Rx2 and Rx3, and is electrically connected to the sensor electrode Rx2. A dummy wiring line D20 is provided to be spaced from the sensor wiring line L2. The dummy wiring line D20 overlaps the sensor electrode Rx1, and is electrically connected to the sensor electrode Rx1. The sensor wiring line L2 and the dummy wiring line D20 are located on the same signal line.

The sensor wiring line L3 overlaps the sensor electrode Rx3, and is electrically connected to the sensor electrode Rx3. A dummy wiring line D31 is provided to overlap the sensor electrode Rx1, and is electrically connected to the sensor electrode Rx1. A dummy wiring line D32 is provided to be spaced from the dummy wiring line D31 and the sensor wiring line L3. The dummy wiring line D32 overlaps the sensor electrode Rx2, and is electrically connected to the sensor electrode Rx2. The sensor wiring line L3 and the dummy wiring lines D31 and D32 are located on the same signal line.

In the touch sensing mode, the touch controller TC applies a touch drive voltage to the sensor wiring lines L. Thus, the touch drive voltage is applied to the sensor electrodes Rx, and sensing by the sensor electrodes Rx is carried out. A sensor signal corresponding to the result of the sensing by the sensor electrodes Rx is output to the touch controller TC via the sensor wiring lines L. The touch controller TC or an external host detects whether there is an object approaching or contacting the display device DSP and position coordinates of the object based on the sensing signal.

In the display mode, the sensor electrodes Rx function as a common electrode CE to which a common voltage (Vcom) is applied. The common voltage is applied via the sensor wiring lines L from a voltage feeding portion contained in the display driver DD, for example.

Figure 3:
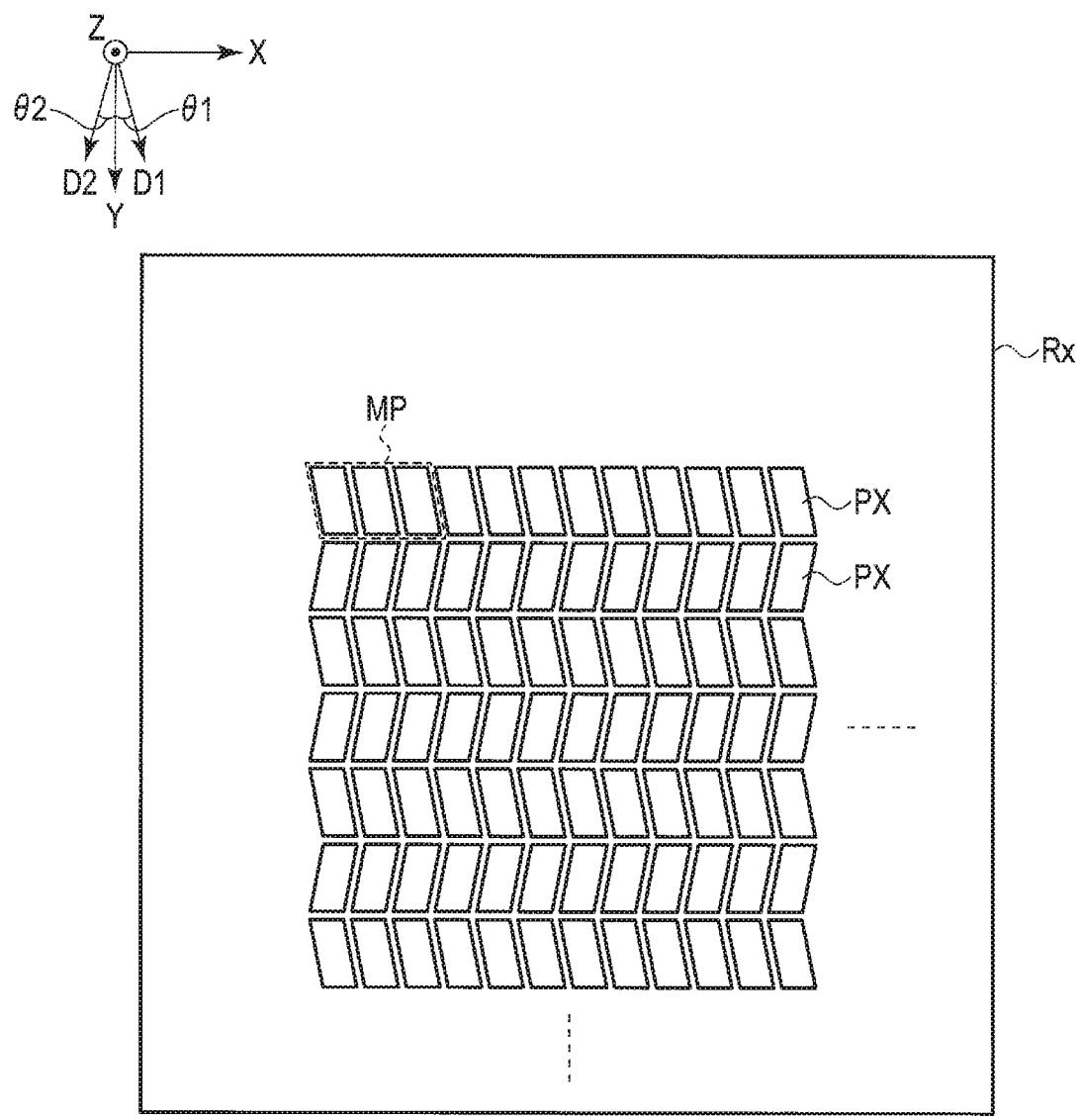
FIG. 3 is a plan view showing a sensor electrode and a pixel shown in FIG. 2.

FIG. 3 is a plan view showing a sensor electrode Rx shown in FIG. 2 and pixels PX. In FIG. 3, a direction intersecting the second direction Y counter-clockwise at an acute angle is defined as a direction D1, whereas a direction intersecting the second direction Y clockwise at an acute angle is defined as a direction D2. Note that an angle θ1 made between the second direction Y and direction D1 is substantially the same as an angle θ2 made between the second direction Y and the direction D2.

One sensor electrode SE is disposed over a plurality of pixels PX. In the example illustrated, those of the pixels PX which are located in odd-numbered lines along the second direction Y each extend along the direction D1. On the other hand, those of the pixels PX which are located in even-numbered lines along the second direction Y each extend along the direction D2. Here, one pixel PX indicates the minimum unit which can be individually controlled according to a pixel signal, and it may be called a sub-pixel. Moreover, the minimum unit for realizing color display may be called a main pixel MP. The main pixel is configured to comprise a plurality of sub-pixels PX which exhibit different colors. For example, a min pixel MP comprises, as sub-pixels PX, a red pixel displaying red, a green pixel displaying green and a blue pixel displaying blue. Note that the main pixel MP may comprise a white pixel displaying white.

For example, in one sensor electrode Rx, sixty to seventy main pixels MP are arranged along the first direction X, and sixty to seventy main pixels MP are arranged along the second direction.

Figure 4:
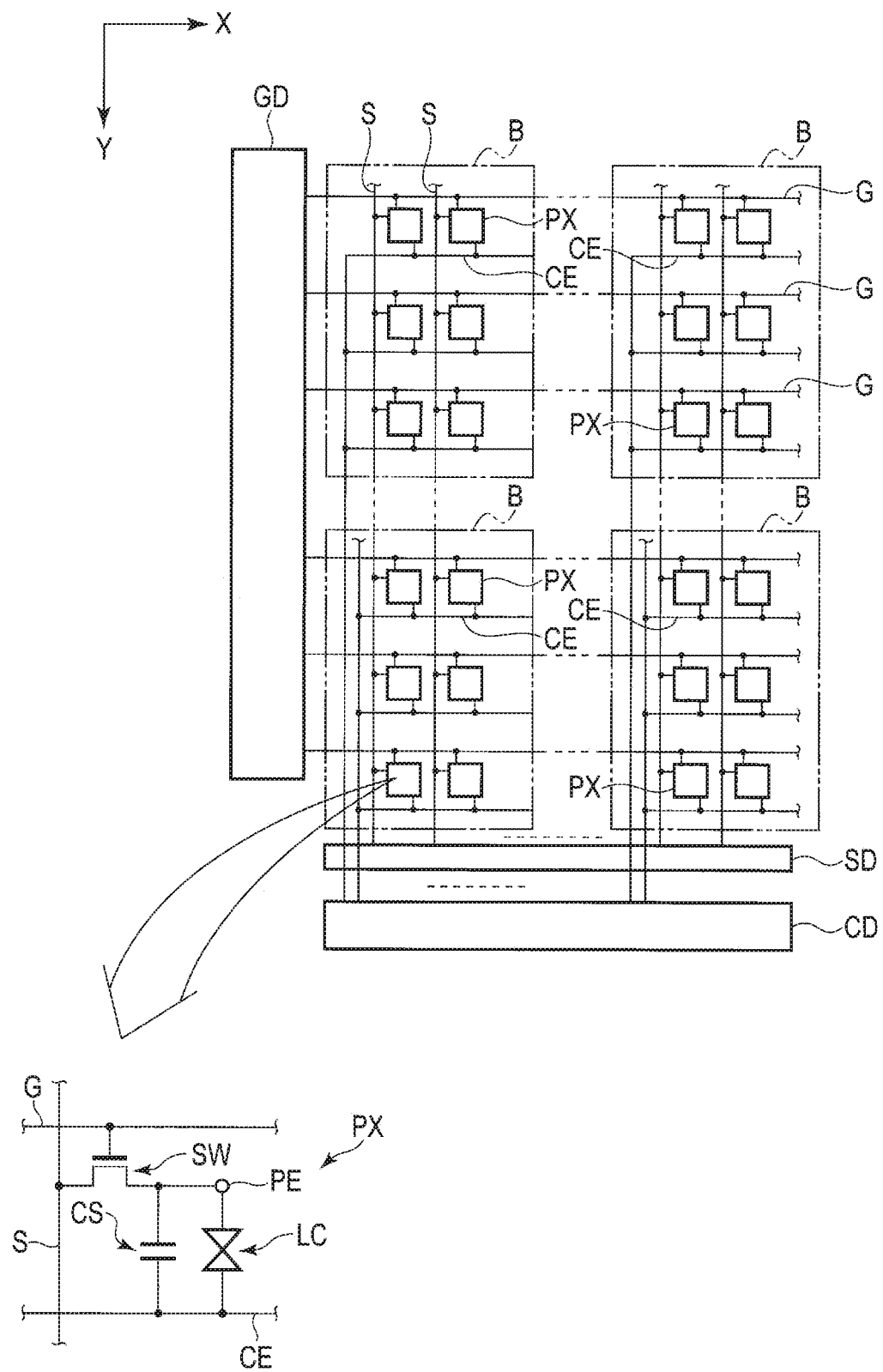
FIG. 4 is a diagram showing a basic structure and an equivalent circuit of the pixel.

FIG. 4 is a view illustrating a basic configuration and an equivalent circuit of a pixel PX.

A plurality of scanning lines G are connected to a scanning line drive circuit GD. A plurality of signal lines S are connected to a signal line drive circuit SD. The scanning lines G and the signal lines S may not extend linearly, but part of the lines may be bent. For example, the signal lines S extend along the second direction Y even if they are partially bent.

One common electrode CE is provided in each sensor block B. The common electrode CE is connected to a voltage supply portion CD of a common voltage (Vcom), and is disposed over a plurality of pixels PX. Moreover, the common electrodes CE are connected also to the touch controller TC as described above, and form the sensor electrodes Rx to which the touch drive voltage is applied in the touch sensing mode.

Each pixel PX comprises a switching element SW, a pixel electrode PE, a common electrode CE, a liquid crystal layer LC and the like. The switching element SW is constituted by, for example, a thin-film transistor (TFT) and is electrically connected to the respective scanning line G and the respective signal line S. The scanning line G is connected to the switching elements SW of the respective pixels PX arranged in the first direction X. The signal line S is connected to the switching elements SW of the respective pixels PX arranged in the second direction Y. The pixel electrodes PE are electrically connected to the respective switching elements SW. Each pixel electrode PE opposes the respective common electrode CE, and drives the liquid crystal layer LC by an electric field produced between the pixel electrode PE and the common electrode CE. A storage capacitor CS is formed between, for example, an electrode of the same potential as that of the common electrode CE and an electrode of the same potential as that of the pixel electrode PE.

Figure 5:
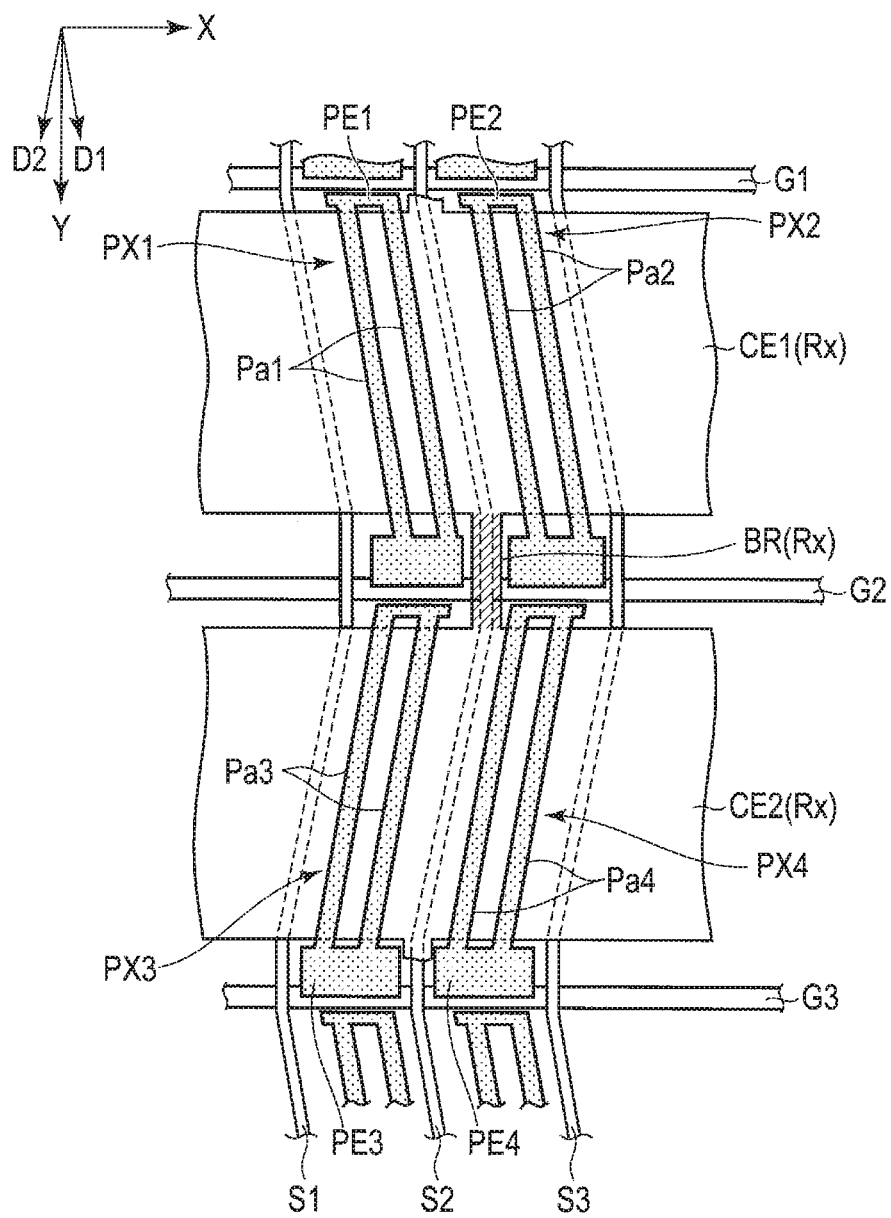
FIG. 5 is a plan view showing an example of layout of the pixels.

FIG. 5 is a plan view showing an example of layout of pixels.

The scanning lines G1 to G3 each extend linearly along the first direction X, and are arranged at intervals along the second direction Y. The signal lines S1 to S4 extend substantially along the second direction Y, and are arranged at intervals along the first direction X.

The pixel electrodes PE1 and PE2 are disposed between the scanning lines G1 and G2. The pixel electrodes PE1 and PE2 are arranged along the first direction X. The pixel electrodes PE3 and PE4 are disposed between the scanning lines G2 and G3. The pixel electrodes PE3 and PE4 are arranged along the first direction X. The pixel electrodes PE1 and PE3 are disposed between the signal lines S1 and S2, and the pixel electrodes PE2 and PE4 are disposed between the signal lines S2 and S3.

The pixel electrodes PE1 and PE2 comprise strip electrodes Pa1 and Pa2, respectively, extending along the direction D1. The pixel electrodes PE3 and PE4 comprise strip electrodes Pa3 and Pa4, respectively, extending along the direction D2. In the example illustrated, the number of each type of the strip electrodes Pa1 to Pa4 is two, but it may be one or three or more.

A common electrode (first common electrode) CE1 is disposed over pixels PX1 and PX2. A common electrode (second common electrode) CE2 is disposed over pixels PX3 and PX4. The common electrodes CE1 and CE2 are arranged along the second direction Y. The common electrodes CE1 and CE2 are contained in one sensor electrode Rx shown in FIG. 2. The common electrode CE1 overlaps the scanning line G1 and the signal lines S1 to S3. The pixel electrodes PE1 and PE2 overlap the common electrode CE1. The common electrode CE2 overlaps the scanning line G3 and the signal lines S1 to S3. The pixel electrodes PE3 and PE4 overlap the common electrode CE2. In the example illustrated, the scanning line G2 are located between the common electrodes CE1 and CE2.

A bridge portion BR is equivalent to a region indicated with slash in the figure. The bridge portion BR is located between the common electrode CE1 and the common electrode CE2 and overlaps the signal line S2. The bridge portion BR is formed to be integrated with the common electrode CE1 and the common electrode CE2 into one body, and electrically connects the common electrode CE1 and the common electrode CE2 to each other. The bridge portion BR is contained in the sensor electrode Rx as in the case of the common electrode CE1 and the common electrode CE2.

FIG. 4 is a plan view showing an example of the pixel PX shown in FIG. 5. Here, the main part will be described while focusing on the pixel PX1 surrounded by the scanning lines G1 and G2 and the signal lines S1 and S2 shown in FIG. 5.

The switching element SW is electrically connected to the scanning line G2 and the signal line S2. The switching element SW comprises a semiconductor layer SC and a drain electrode (first drain electrode) DE1.

The semiconductor layer SC is disposed so that one part thereof overlaps the signal line S2 and the other parts extends between the signal lines S1 and S2 to form substantially a U shape. The semiconductor layer SC intersects the scanning line G2 in the position where it overlaps the signal line S2 and intersects the scanning line G2 also between the signal lines S1 and S2. In the scanning line G2, the region overlapping the semiconductor layer SC functions as the gate electrodes GE1 and GE2. That is, in the example illustrated, the switching element SW has a double-gate structure. The semiconductor layer SC is electrically connected by its one end portion SCA to the signal line S2 via a through-hole CH1, and by its other end portion SCB, electrically connected to the drain electrode DE1 via a through-hole CH2.

The drain electrode DE1 is formed into an island-like shape, and is disposed between the signal line S1 and the signal line S2. Note that in the switching element SW, the drain electrode DE1 may be referred to as a source electrode.

The pixel electrode PE1 comprises a base BS1 integrated with the plurality of strip electrodes Pa1. The base BS1 overlaps the drain electrode DE1, and is electrically connected to the drain electrode DE1. A connecting portion between the pixel electrode PE1 and the switching element SW will be described later.

Figure 6:
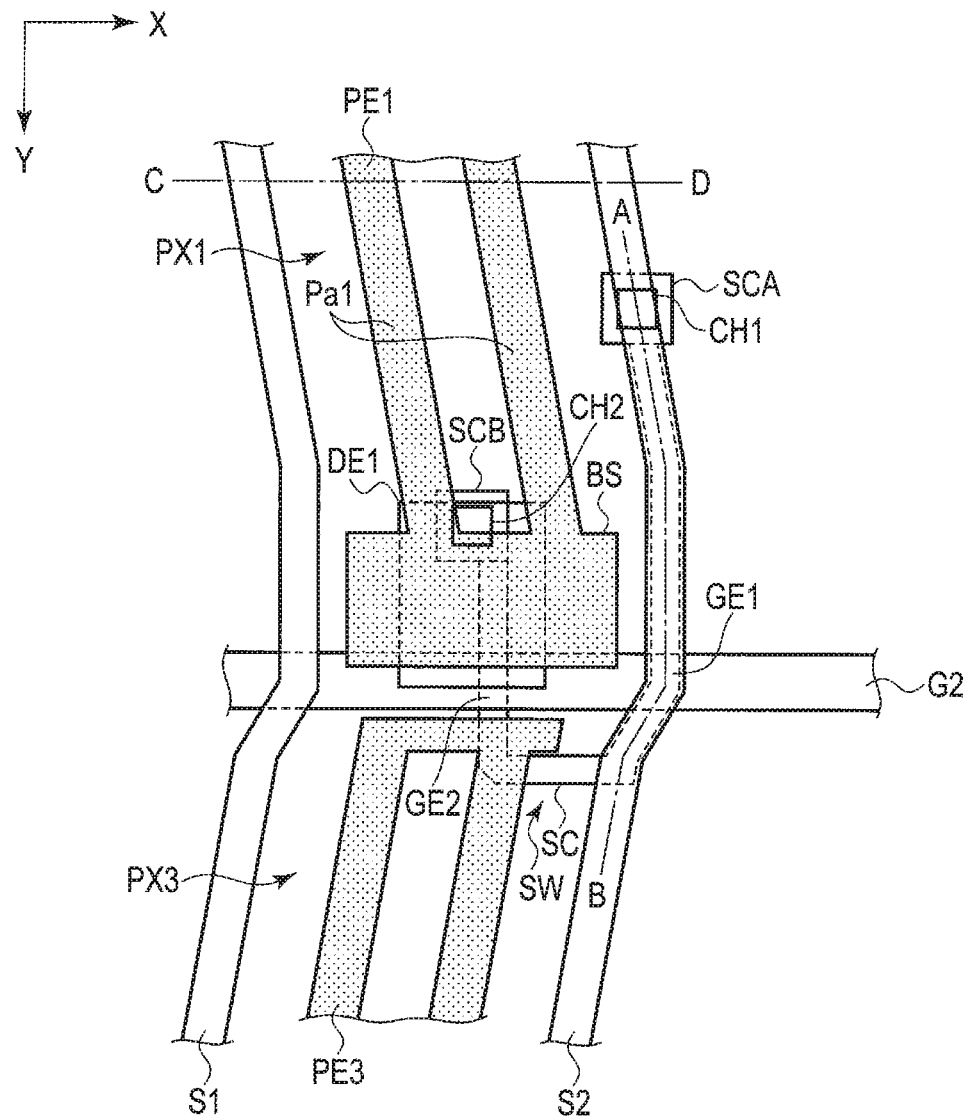
FIG. 6 is a plan view showing an example of the pixel shown in FIG. 5.
Figure 7:
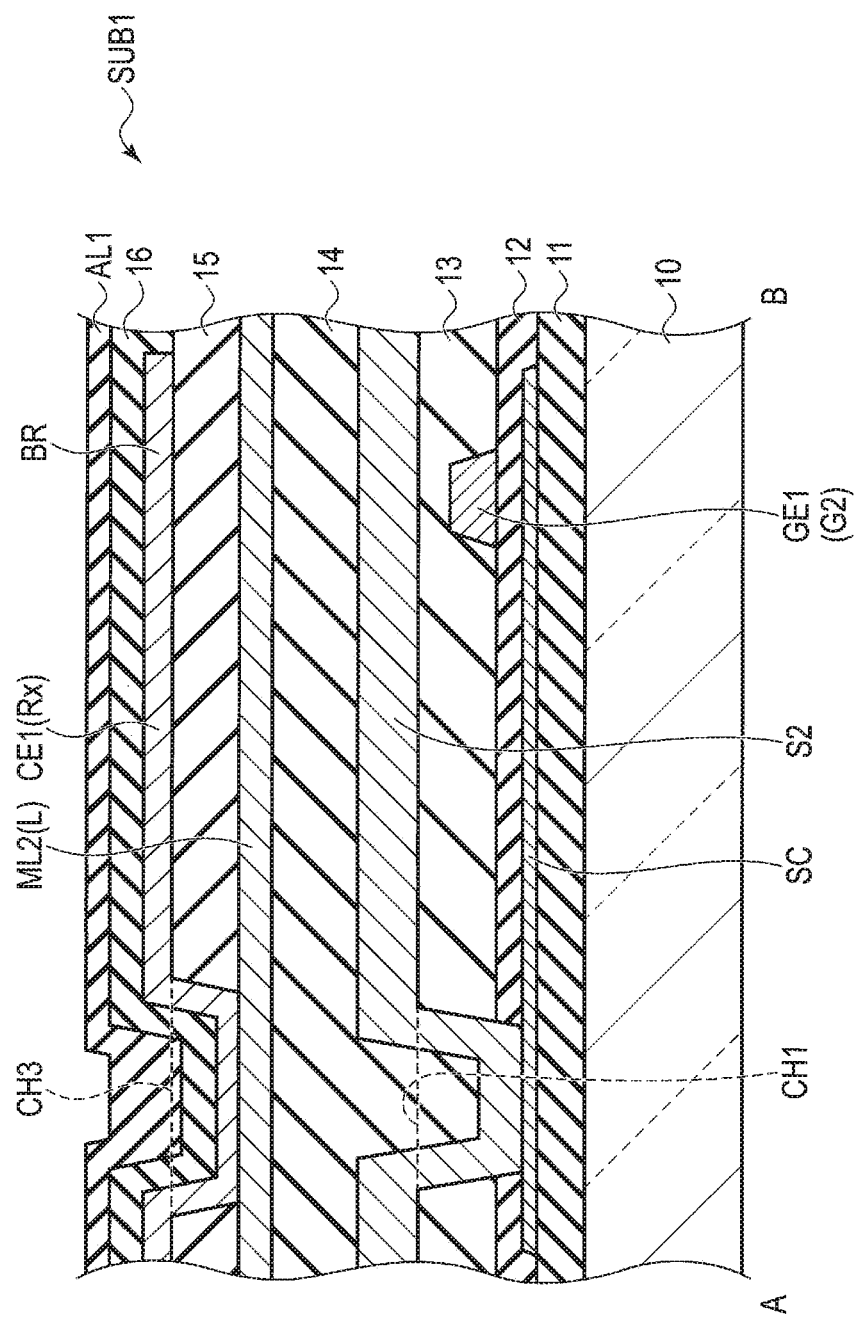
FIG. 7 is a cross-sectional view of a first substrate taken along line A-B in FIG. 6.

FIG. 7 is a cross-sectional view of the first substrate SUB1 taken along line A-B shown in FIG. 6. The first substrate SUB1 comprises an insulating substrate 10, insulating films 11 to 16, a semiconductor layer SC, a scanning line G2, a signal line S2, a metal wire ML2, a common electrode CE1, a bridge portion BR, an alignment film AL1 and the like.

The insulating substrate 10 is a light transmissive substrate such as a glass substrate or a flexible resin substrate. The insulating film 11 is located on the insulating substrate 10. The semiconductor layer SC is located on the insulating film 11, and is covered by an insulating film 12. The semiconductor layer SC is formed of, for example, polycrystalline silicon, but may be formed of amorphous silicon or an oxide semiconductor.

The gate electrode GE1, which is a part of the scanning line G2, is located on the insulating film 12, and is covered by the insulating film 13. Note that the other scanning lines which are not illustrated are located in the same layer as that of the scanning line G2. The scanning line G2 is formed of a metal material such as aluminum (Al), titanium (Ti), silver (Ag), molybdenum (Mo), tungsten (W), copper (Cu) or chromium (Cr), or an alloy of any combination of these metal materials, and it may be of a single- or multi-layer structure. For example, the scanning line G2 is formed from a molybdenum-tungsten alloy.

The signal line S2 is located on the insulating film 13 and is covered by an insulating film (first insulating film) 14. Note that the other signal lines which are not illustrated are located in the same layer as that of the signal line S2. The signal line S2 is formed of a metal material of those listed above or an alloy of any combination thereof, and it may be of a single- or multi-layer structure. For example, the signal line S2 is a stacked layered body in which the first layer containing titanium (Ti), the second layer containing aluminum (Al) and the third layer containing titanium (Ti) are stacked in this order. The signal line S2 is in contact with the semiconductor layer SC via a through-hole CH11 which penetrates the second insulating film 12 and the third insulating film 13.

The metal wire ML2 is located on the insulating film 14, and is covered by the insulating film (second insulating film) 15. The metal wire ML2 is formed of a metal material of those listed above or an alloy of any combination thereof, and it may be of a single- or multi-layer structure. For example, the metal wire ML2 is a layered body in which the first layer containing titanium (Ti), the second layer containing aluminum (Al) and the third layer containing titanium (Ti), or the first layer containing molybdenum (Mo), the second layer containing aluminum (Al) and the third layer containing molybdenum (Mo) are stacked in this order.

The common electrode CE1 and the bridge portion BR are located on the insulating film 15, and are covered by the insulating film (third insulating film) 16. The common electrode CE and the bridge portion BR are transparent electrodes each formed of a transparent conductive material such as indium tin oxide (ITO) or indium zinc oxide (IZO). The common electrode CE1 is in contact with the metallic wire ML2 via a through-hole CH3 which penetrates the insulating film 15. The alignment film AL1 is located on the insulating film 16.

The insulating films 11 to 13 and the insulating film 16 are inorganic insulating films each formed from an inorganic insulating material such as a silicon oxide, silicon nitride or silicon oxynitride, and they may be of a single- or multi-layer structure. The insulating films 14 and 15 are organic insulating films each formed of an organic insulating material, for example, an acrylic resin.

As described above, the common electrode CE1 functions as a sensor electrode Rx and a metal wire ML2 functions as a sensor wire L electrically connected to the sensor electrode Rx.

Figure 8:
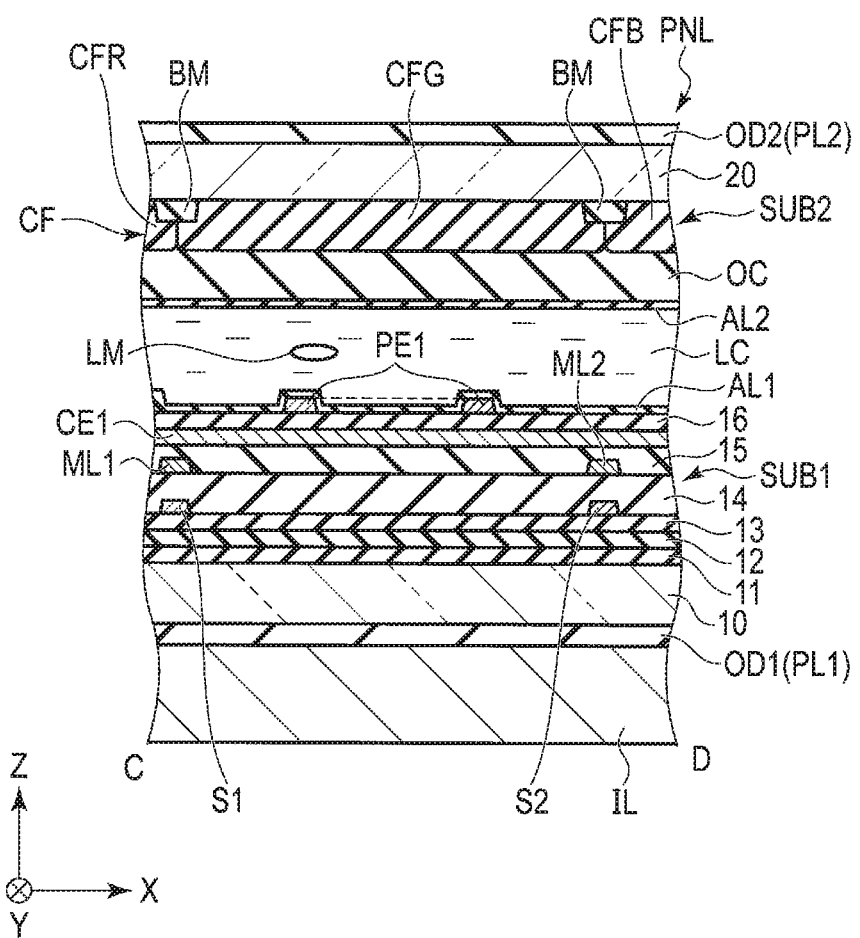
FIG. 8 is a cross-sectional view showing a display panel PNL taken along line C-D in FIG. 6.

FIG. 8 is a cross-sectional view showing the display panel PNL seen along line C-D in FIG. 6. The example illustrated is the case where a display mode using a lateral electric field is applied.

In the first substrate SUB1, the signal lines S1 and S2 are located on the insulating film 13, and are covered by the insulating film 14. The metal wires ML1 and ML2 are located immediately above the signal lines S1 and S2, respectively. The pixel electrode PE1 is disposed on the insulating film 16 and is covered by the alignment film AL1. The pixel electrode PE is a transparent electrode formed of a transparent, electrically conductive material such as ITO or IZO.

The second substrate SUB2 comprises a second insulating substrate 20, a light-shielding layer BM, a color filter CF, an overcoat layer OC, an alignment film AL2 and the like.

As in the case of the insulating substrate 10, the insulating substrate 20 is a light transmissive substrate such as a glass substrate or a resin substrate. The light-shielding layer BM and the color filter CF are located on a side of the insulating substrate 20, which oppose the first substrate SUB1. The color filter CF is disposed at a position opposing the pixel electrode PE1, and partially overlaps the light-shielding layer BM. The color filter CF includes a red color filter CFR, a green color filter CFG and a blue color filter CFB. The overcoat layer OC covers the color filter CF. The overcoat layer OC is formed of a transparent resin material. The alignment film AL2 covers the overcoat layer OC. The alignment film AL1 and the alignment film AL2 are formed of, for example, a material which exhibits horizontal alignment properties.

The first substrate SUB1 and the second substrate SUB2 described above are disposed such that the alignment film AL1 and the alignment film AL2 oppose each other. The first substrate SUB1 and the second substrate SUB2 are adhered to each other with a predetermined cell gap formed therebetween. The liquid crystal layer LC is held between the alignment film AL1 and the alignment film AL2. The liquid crystal layer LQ contains liquid crystal molecules LM. The liquid crystal layer LC is formed from a positive type (positive dielectric constant anisotropy) or a negative type (negative dielectric constant anisotropy) liquid crystal material.

An optical element OD1 including a polarizer PL1 is adhered to the insulating substrate 10. An optical element OD2 including a polarizer PL2 is adhered onto the insulating substrate 20. Note that the optical element OD1 and the optical element OD2 may comprise a retardation film, a scattering layer, an antireflective layer or the like when necessary.

In the display panel PNL with such a configuration, the liquid crystal molecules LM are initially aligned in a predetermined direction between the alignment film AL1 and the alignment film AL2 in an OFF state in which an electric field is not formed between the pixel electrode PE and the common electrode CE. In the OFF state as such, light irradiated from an illumination device IL towards the display panel PNL is absorbed by the optical element OD1 and the optical element OD2, thus creating dark display. On the other hand, in the ON state in which an electric field is formed between the pixel electrode PE and the common electrode CE, the liquid crystal molecules LM is aligned by the electric field in a direction different the direction in the initial alignment, and the direction of alignment is controlled by the electric field. In the ON state as such, part of the light from the illumination device IL passes through the optical element OD1 and the optical element OD2, thus creating bright display.

Next, the display device DSP according to the first embodiment will be described in detail.

Figure 9:
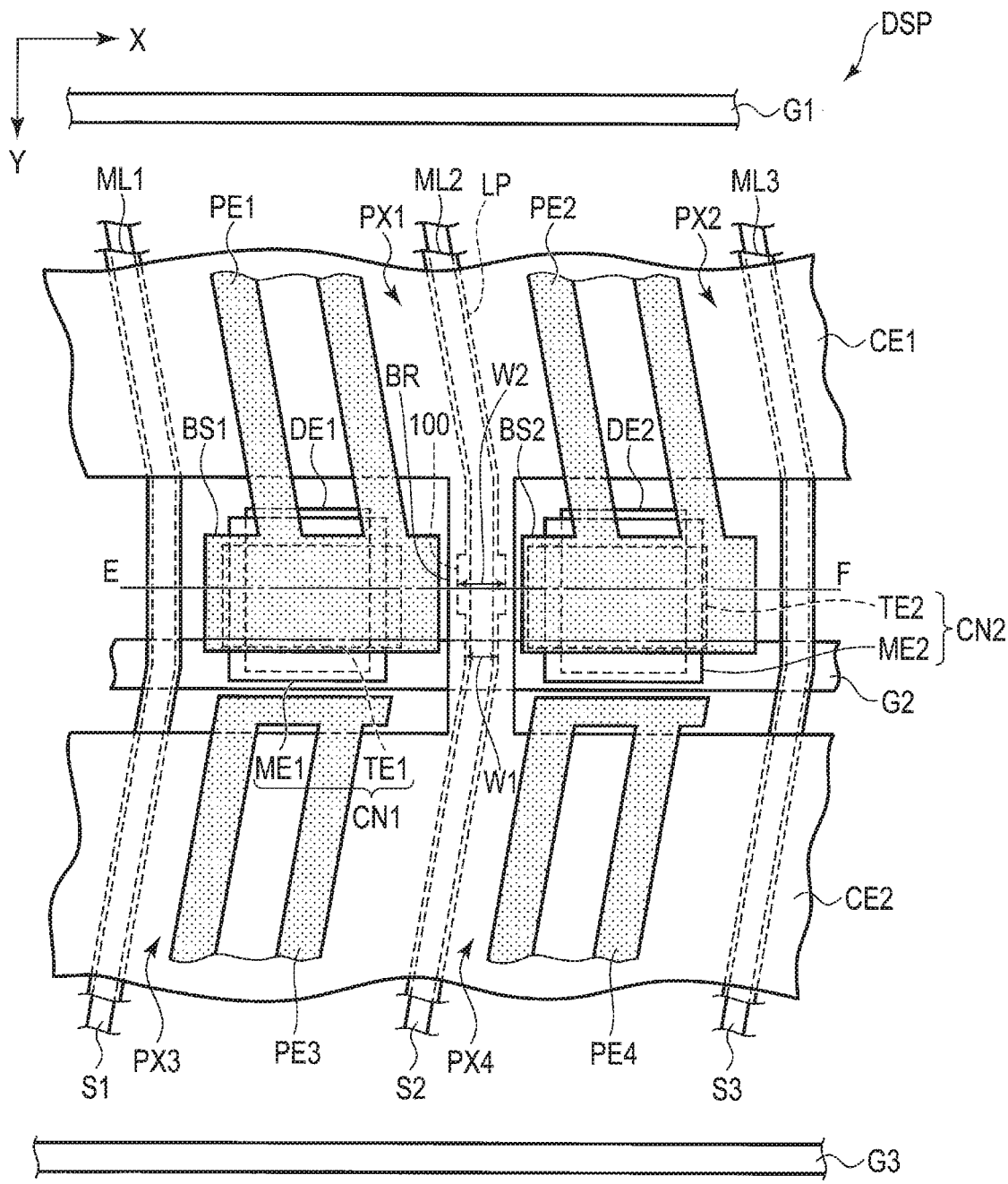
FIG. 9 is a detailed plan view showing a vicinity of a bridge portion in the pixel layout shown in FIG. 5.

FIG. 9 is a detailed plan view showing the vicinity of the bridge portion BR in the pixel layout in FIG. 5. The pixel PX1 comprises a pixel electrode PE1, a drain electrode DE1, a first metal electrode ME1 and a first transparent electrode TE1. The first metal electrode ME1 and the first transparent electrode TE1 overlap the base BS1 and the drain electrode DE1 to form a connection portion CN1 which electrically connects the pixel electrode PE1 and the drain electrode DE1 to each other. The pixel PX2 comprises a pixel electrode PE2, a drain electrode (second drain electrode) DE2, a second metal electrode ME2 and a second transparent electrode TE2. The drain electrodes DE1 and DE2 are arranged along the first direction X. The second metal electrode ME2 and the second transparent electrode TE2 overlap the base BS2 and the drain electrode DE2 to form a connection portion CN2 which electrically connects the pixel electrode PE2 and the drain electrode DE2 to each other.

As will be described later, the common electrodes CE1 and CE2, the first transparent electrode TE1, the second transparent electrode TE2 and the bridge portion BR are disposed in the same layer. The first transparent electrode TE1 and the second transparent electrode TE2 are arranged along the first direction X between the common electrode CE1 and the common electrode CE2. The bridge portion BR is located between the first transparent electrode TE1 and the second transparent electrode TE2.

The metal wires ML1 to ML3 overlap the signal lines S1 to S3, respectively. The metal wire ML2 comprises a line portion LP and a pedestal portion 100 in a position overlapping the bridge portion BR. The line portion LP has a width W1. The pedestal portion 100 has a width W2. The width W2 is greater than the width W1. The metal wire ML2 is electrically connected to the bridge portion BR in the pedestal portion 100. That is, the pedestal portion 100 is in contact with the bridge portion BR in the through-hole which overlaps the pedestal portion 100. The pedestal portion 100 is formed to be broad so as to secure the region to be in contact with the bridge portion BR. The metal electrode ML2 is electrically connected to the common electrodes CE1 and CE2 via the bridge portion BR.

FIG. 10 is a plan view showing positions of light-shielding layer BM, the metal wires ML1 to ML3, the first metal electrode ME1 and the second metal electrode ME2, which correspond to the pixel layout in FIG. 9.

The first metal electrode ME1 is located between the metal wire ML1 and the metal wire ML2. The second metal electrode ME2 is located between the metal wire ML2 and the metal wire ML3. The pedestal portion 100 of the metal wire ML2 is located between the first metal electrode ME1 and the second metal electrode ME2. For example, the width W2 of the pedestal portion 100 is about 7.6 μm. Moreover, for example, the width of the first metal electrode ME1 and the second metal electrode ME2, taken along the first direction X, is about 8.0 μm.

As will be discussed later, the through-holes CH11 and CH12 penetrate the insulating film 14, and a through-hole CH23 penetrates the insulating film 15. The through-hole CH11 is formed in a position overlapping the first metal electrode ME1. The through-hole CH12 is formed in a position overlapping the second metal electrode ME2. The through-hole CH23 is located between the first metal electrode ME1 and the second metal electrode ME2, and is formed in a position overlapping the pedestal portion 100. The width of the through-hole CH23 along the first direction X is about 4 μm.

The through-hole CH11 is located approximately at a center between the metal wire ML1 and the metal wire ML2 in plan view. The first metal electrode ME1 has a width (first width) W11 on a side of the pedestal portion 100 with respect to the through-hole CH11, and a width (second width) W12 on an opposite side to the pedestal portion 100 with respect to the through-hole CH11. The width W2 is greater than the width W1. That is, the first metal electrode ME1 is disposed closer to the metal wire ML1 as compared to the metal ire ML2.

The through-hole CH12 is located approximately at a center between the metal wires ML2 and ML3 in plan view. The second metal electrode ME2 has a width (third width) W13 on a side of the pedestal portion 100 with respect to the through-hole CH12 and a width (fourth width) W14 on an opposite side to the pedestal portion 100 with respect to the through-hole CH12. The width W14 is greater than the width W13. That is, the second metal electrode ME2 is disposed closer to the metal wire ML3 as compared to the metal wire ML2. Therefore, the first metal electrode ME1 and the second metal electrode ME2 are disposed on one side so as to be spaced from the pedestal portion 100.

The light-shielding layer BM is formed into a grid shape, and overlaps each of the scanning lines G1 to G3, the signal lines S1 to S3, the metal wires ML1 to ML3, the connection portions CN1 and CN2, the bases BS1 and BS2 and the drain electrodes DE1 and DE2, shown in FIG. 9. The light-shielding layer BM includes a first portion BM11 extending in the first direction X, and second portions BM21 to BM23 extending in the second direction Y. The first portion BM11 has a width W21 along in the second direction Y, and the second portions BM21 to BM23 each have a width W22 along the first direction X. The width W21 is greater than the width W22. The first portion BM11 overlaps the pedestal portion 100, the first metal electrode ME1, the second metal electrode ME2 and the through-holes CH11, CH23 and CH12.

According to this embodiment, the first metal electrode ME1 and the second metal electrode ME2 are disposed on one side which is spaced apart from the metal wire ML2. With this configuration, the pedestal portion 100 can be disposed between the first metal electrode ME1 and the second metal electrode ME2. In other words, the pedestal portion 100 can be placed in the position overlapping the first portion BM11 of the light-shielding layer BM. For example, when the pedestal portion 100 is disposed in the position overlapping the second portion BM22 of the light-shielding layer BM, light reflected in the pedestal portion 100 may leak from both sides of the second portion BM22. In this embodiment, the pedestal portion 100 is located in the position overlapping the first portion BM1 having a width greater than that of the second portion BM22, the leakage of light from around the pedestal portion 100 can be inhibited. Therefore, the degrading of the contrast of the display device caused by leakage of light can be suppressed. Thus, deterioration in display quality can be suppressed.

Figure 11:
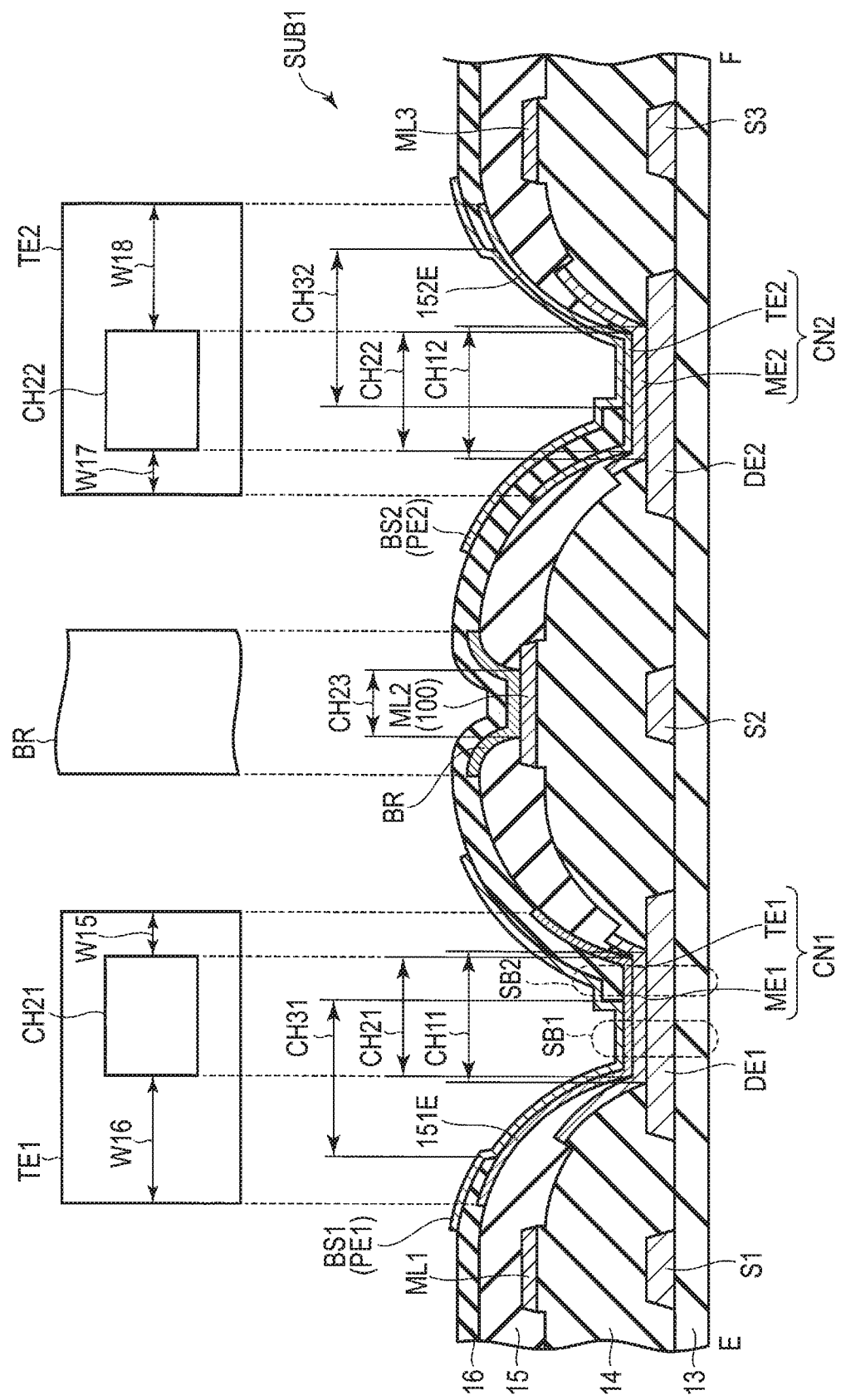
FIG. 11 is a cross-sectional view of the first substrate taken along line E-F in FIG. 10.

FIG. 11 is a cross-sectional view of the first substrate SUB1 taken along line E-F in FIG. 9. Note that in the first substrate SUB1 shown, the layers below the insulating film 13 and the alignment film AL1 omitted from the illustration. Moreover, FIG. 11 also shows a plan view of each of the first transparent electrode TE1, the second transparent electrode TE2 and the bridge portion BR, which corresponds to the section.

The first substrate SUB1 includes the drain electrodes DE1 and DE2, the signal lines S1 to S3, the first metal electrode ME1, the second metal electrode ME2, the first transparent electrode TE1, the second transparent electrode TE2, the metal wires ML1 to ML3, the insulating films 13 to 16, the pixel electrodes PE1 and PE2 and the bridge portion BR.

The signal lines S1 to S3 and the drain electrodes DE1 and DE2 are located on the insulating film 13, and are covered by the insulating film 14. The drain electrodes DE1 and DE2 are located in the same layer as that of the signal lines S1 to S3, and are formed of a material identical to that of the signal lines S1 to S3.

The insulating film 14 comprises the through-hole (first through-hole) CH11 which penetrates to the drain electrode DE1, and the through-hole (fifth through-hole) CH12 which penetrates to the drain electrode DE2.

The metal wires ML1 to ML3, the first metal electrode ME1 and the second metal electrode ME2 are located on the insulating film 14, and they are covered by the insulating film 15. The first metal electrode ME1 is in contact with the drain electrode DE1 in the through-hole CH11. Similarly, the second metal electrode ME2 is in contact with the drain electrode DE2 in the through-hole CH12. The first metal electrode ME1 and the second metal electrode ME2 are located in the same layer as that of the metal wires ML1 to ML3, and they are formed of a metal material identical to that of the metal wires ML1 to ML3. The metal wires ML1 to ML3 are located immediately above the signal lines S1 to S3, respectively.

As shown in FIG. 10, the first metal electrode ME1 and the second metal electrode ME2 are displaced to a side spaced away from the metal wire ML2. The first metal electrode ME1, the second metal electrode ME2 and the pedestal portion 100 are located in the same layer, and with such a layout, short-circuiting between the first metal electrode ME1 and the pedestal portion 100 and that between the second metal electrode ME2 and the pedestal portion 100 can be suppressed.

The insulating film 14 is scraped when the metal wires ML1 to ML3, the first metal electrode ME1 and the second metal electrode ME2 are subjected to dry etching. Therefore, a difference in level is created in the insulating film 14 between a region where the film overlaps the metal wires ML1 to ML3, the first metal electrode ME1 and the second metal electrode ME2, and another region where it does not overlap these.

The insulating film 15 is located on the insulating film 14, and comprises a through-hole (second through-hole) CH21 which penetrates to the first metal electrode ME1, a through-hole (sixth through-hole) CH22 which penetrates to the second metal electrode ME2, and a through-hole (fourth through-hole) CH23 which penetrates to the pedestal portion 100. The width of the through-hole CH21 is less than the width of the through-hole CH11, and the width of the through-hole CH22 is less than the width of the through-hole CH12.

The first transparent electrode TE1 and the second transparent electrode TE2 and the bridge portion BR are located on the insulating film 15, and are covered by the insulating film 16. The first transparent electrode TE1 is in contact with the first metal electrode ME1 in the through-hole CH21. Similarly, the second transparent electrode TE2 is in contact with the second metal electrode ME2 in the through-hole CH22. The bridge portion BR is in contact with the pedestal portion 100 in the through-hole CH23. The first transparent electrode TE1, the second transparent electrode TE2 and the bridge portion BR are located in the same layer as that of the common electrodes CE1 and CE2 shown in FIG. 9, and are formed of a transparent conductive material as that of the common electrodes CE1 and CE2.

The through-hole CH21 is located approximately at a center between the metal wire ML1 and the metal wire ML2. The first transparent electrode TE1 has a width (fifth width) W15 on a side of the bridge portion BR with respect to the through-hole CH21 and a width (sixth width) W16 on a side opposite to the bridge portion BR with respect to the through-hole CH21. The width W16 is greater than the width W16. In other words, the first transparent electrode TE1 is displaced to a side spaced away from the bridge portion BR with respect to the through-hole CH21.

The through-hole CH22 is located approximately at a center between the metal wire ML2 and the metal wire ML3. The second transparent electrode TE2 has a width (seventh width) W17 on a side of the bridge portion BR with respect to the through-hole CH22, and a width (eighth width) W18 on an opposite side to the bridge portion BR with respect to the through-hole CH22. The width W18 is greater than the width W17. That is, the second transparent electrode TE2 is displaced to a side spaced away from the bridge portion BR with respect to the through-hole CH22.

As described above, the first transparent electrode TE1 and the second transparent electrode TE2 are displaced to the side spaced away from the bridge portion BR. The first transparent electrode TE1, the second transparent electrode TE2 and the bridge portion BR are located in the same layer, and with such a layout, short-circuiting between the first transparent electrode TE1 and the bridge portion BR and that between the second transparent electrode TE2 and the bridge portion BR can be suppressed.

The insulating film 16 is located on the insulating film 15, and comprises a through-hole (third through-hole) CH31 which penetrates to the first transparent electrode TE1, and a through-hole CH32 which penetrates to the second transparent electrode TE2. The through-hole CH31 is located on one side which is spaced away from the bridge portion BR with respect to the through-holes CH11 and CH21. The through-hole CH32 is located on one side which is spaced away from the bridge portion BR with respect to the through-holes CH12 and CH22.

The base BS1 of the pixel electrode PE1 and the base BS2 of the pixel electrode PE2 are located on the insulating film 16, and are covered by the alignment film AL1 (not shown). The pixel electrode PE1 is in contact with the first transparent electrode TE1 in the through-hole CH31. Similarly, the pixel electrode PE2 is in contact with the second transparent electrode TE2 in the through-hole CH32.

In the through-hole CH11, the stacked layer bodies SB1 and SB2 are disposed. The stacked layer body SB1 includes the drain electrode DE1, the first metal electrode ME1, the first transparent electrode TE1 and the pixel electrode PE1 staked one on another in this order. The stacked layer body SB2 includes the drain electrode DE1, the first metal electrode ME1, the first transparent electrode TE1, the insulating film 16 and the pixel electrode PE1 stacked one on another in this order. In the example illustrated, the stacked layer body SB1 is located on a side close to the signal line S1 and the metal wire ML1, and the stacked layer body SB2 is located on a side close to the signal line S2 and the metal wire ML2.

The insulating film 15 comprises an end portion 151E located between the first metal electrode ME1 and the first transparent electrode TE1 in a region between a set of the signal line S1 and the metal wire ML1 and the through-hole CH21. The pixel electrode PE1 is in contact with the first transparent electrode TE1 in a region immediately above the end portion 151E. Similarly, the insulating film 15 comprises an end portion 152E located between the second metal electrode ME2 and the second transparent electrode TE2 in a region between a set of the signal line S3 and the metal wire ML3 and the through-hole CH22. The pixel electrode PE2 is in contact with the second transparent electrode TE2 in a region immediately above the end portion 152E.

As described above, according to the first embodiment, a display device which can suppress degradation of the image quality can be provided.

Next, a display device of the second embodiment will be explained in detail.

Figure 12:
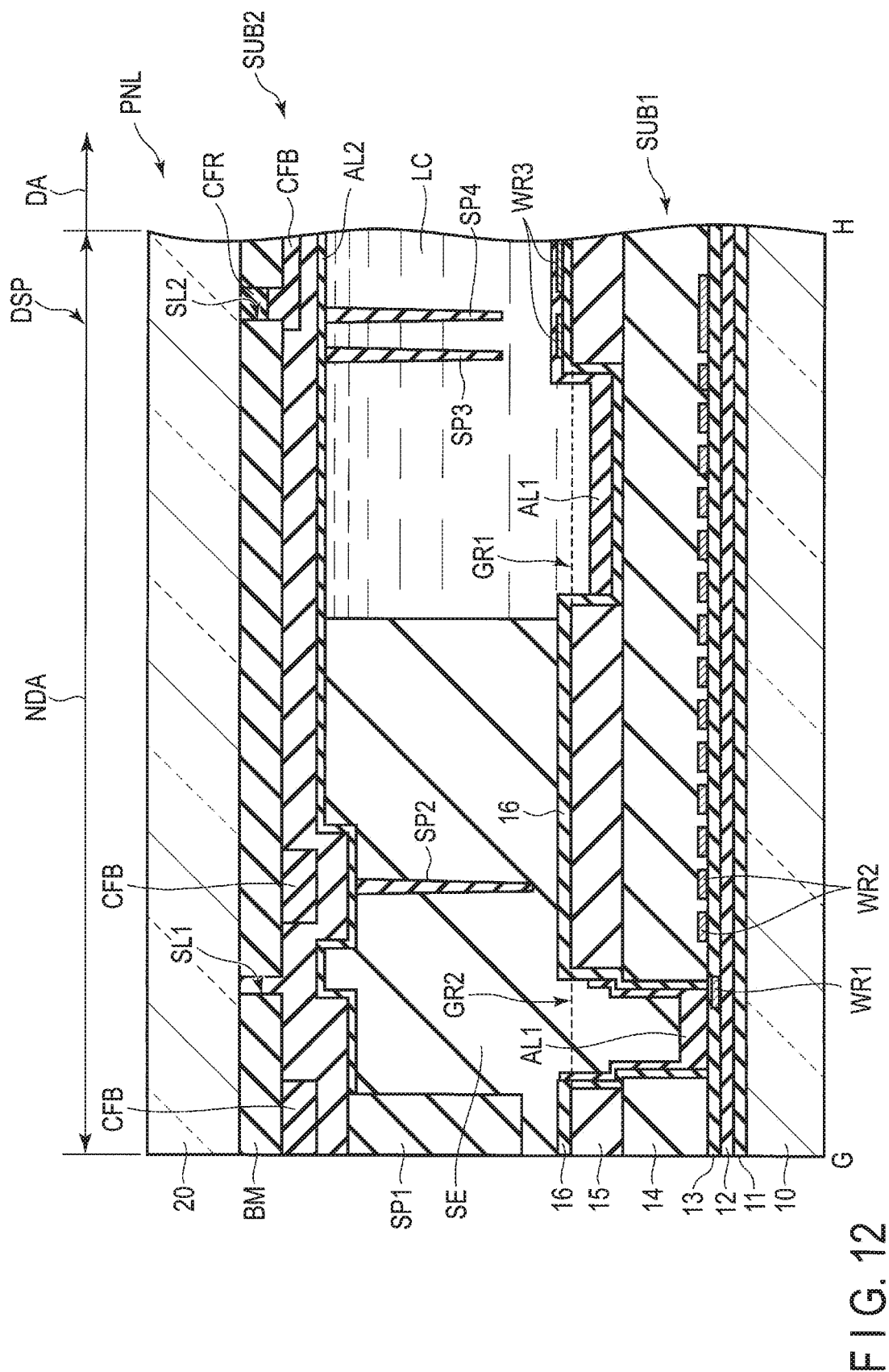
FIG. 12 is a cross-sectional view showing the display panel taken along line G-H in FIG. 1.

FIG. 12 is a cross-sectional view showing a display panel PNL taken along line G-H in FIG. 2. FIG. 12 shows a non-display area NDA of the display panel PNL.

The first substrate SUB1 comprises peripheral wires WR1 to WR3 in the non-display area NDA. The peripheral wire WR1 is disposed on the insulating film 12 and is covered by the insulating film 13. The peripheral wire WR1 is disposed in the same layer as that of the scanning line, and is formed from a material identical to that of the scanning line. The peripheral wire WR2 is disposed on the insulating film 13, and is covered by the insulating film 14. The peripheral wire WR2 is disposed in the same layer as that of the signal line and is formed from a material identical to that of the signal line. The peripheral wire WR3 is disposed on the insulating film 16, and is covered by the alignment film AL1. The peripheral wire WR3 is disposed in the same layer as that of the pixel electrode, and is formed from a material identical to that of the pixel electrode.

The first substrate SUB1 comprises a groove GR1 which penetrates the insulating film 15 to the insulating film 14 in the non-display area NDA. The groove GR1 is located on a side of the display area DA with respect to the sealing material SE. Further, the first substrate SUB1 comprises a groove GR2 which penetrates the insulating films 14 and 15 to the insulating film 13 in the non-display area NDA. The groove GR2 overlaps the sealing material SE.

The insulating film 16 is disposed on the insulating film 15, and also inside the groove GR1 and the groove GR2. The insulating film 16 is in contact with a side surface and a bottom surface of the groove GR1, and is in contact with a side surface of the groove GR2. A difference in level is created in the side surface of the groove GR2 by the insulating films 14 and 15, and therefore the insulating film 16 easily adheres to the side surface of the groove GR2.

The alignment film AL1 is disposed on the peripheral wire WR3 and also inside the groove GR1 and the groove GR2. In a region which overlaps the sealing material SE, the alignment film AL1 is not disposed on the insulating film 15. Thus, the sealing material SE is in contact with the insulating film 16. For example, if the alignment film AL1 is placed under the sealing material SE, the adhesion strength between the alignment film AL1 and the insulating film 16 becomes weak, thereby possibly causing the peeling-off.

In this embodiment, the first substrate SUB1 comprises a groove GR1 located on a side of the display area DA with respect to the sealing material SE. With this configuration, even if the material of the printed alignment film AL1 flows to the sealing material SE side, the flowing portion can be stopped by the groove GR1, and thus it is possible to inhibit the flow from reaching the region which overlaps the sealing material SE. Moreover, even if the frame of the display device DSP can be narrowed, it is still possible to inhibit the material of the alignment film AL1 from flowing under the sealing material SE. Thus, the lowering of the adhesion strength between the first substrate SUB1 and the second substrate SUB2 can be suppressed and the entering of moisture from the interface created by the peeling-off can be inhibited.

In order to stop the flow of the material alignment film AL1 within the groove GR1, the depth of the groove GR1 should preferably be 0.2 μm or more. In this embodiment, the depth of the groove GR1 is, for example, about 1.5 μm.

Further, in this embodiment, the first substrate SUB1 comprises two layers, namely, the insulating films 14 and 15, each formed of an organic insulating material. Therefore, of the two organic insulating films, the groove GR1 is formed to penetrate the insulating film 15, which is closer to the liquid crystal layer LC. As compared to the case where a groove portion is formed by carrying out half exposure on one organic insulating film, in this embodiment, the side surface of the groove GR1 can be formed steep to the bottom surface. Since the form of the side surface of the groove GR1 is steep, it is possible to inhibit the material of the alignment film AL1 from flowing and running onto the region under the sealing material SE. Moreover, in order to stop the sealing material SE more reliably by the groove GR1, the groove GR1 can be deepened to such an extent that it does not penetrate the insulating film 14.

Moreover, with the groove GR2, the entering path of moisture migrating from the outside of the display panel PNL through the insulating films 14 and 15 can be blocked.

The light-shielding layer BM comprises a slit SL1 penetrating to the second insulating substrate 20. The entering path of moisture migrating in the light-shielding layer BM can be blocked by the slit SL1. Note that the first substrate SUB1 comprises, in a position which overlaps the slit SL1, a peripheral wire WR1, and with this configuration, the leakage of light from the slit SL1 can be inhibited.

The light-shielding layer BM comprises a slit SL2 in the region which overlaps the liquid crystal layer LC. With this configuration, the migration path of electric charge to the display area DA via the light-shielding layer BM can be blocked in the slit SL2. Thus, it is possible to inhibit static electricity form concentrating on the display area DA in the manufacturing process of the display panel PNL, and to suppress damaging to the display panel PNL. Note that the first substrate SUB1 comprises, in the position which overlaps the slit SL2, a peripheral wire WR2, and with this configuration, the leakage of light from the slit SL2 can be suppressed. Moreover, the color filters CFR and CFB are disposed in the slit SL2 to overlap each other in the third direction Z. Thus, the leakage of light from the slit SL2 can be suppressed also against the light portion passing through around the peripheral wire WR2.

Spacers SP1 to SP4 are disposed on the second substrate SUB2 and project out to a side of the first substrate SUB1. The spacers SP1 to SP4 are each formed of, for example, a resin material. Further, a color filter CFB for height adjustment is provided in the position which overlaps the spacers SP1 and SP2. The liquid crystal layer LC is surrounded by the first substrate SUB1, the second substrate SUB2 and the sealing material SE.

FIG. 13 is a plan view indicating positions of the grooves GR1 and GR2 shown in FIG. 11.

The groove GR1 includes portions GR11 and GR12 extending in the second direction Y, and a portion GR13 extending in the first direction X. The portions GR11 and GR12 are each connected to the portion GR13. In this embodiment, the groove GR1 should preferably have a width of 100 µm. The groove GR1 is not formed between the display area DA and the mounting portion MA. On the mounting portion MA side, the distance from the display area DA to the sealing material SE is great, the alignment film AL1 does not reach the sealing material SE. With this configuration, on the mounting portion MA side of the display area DA, the groove GR1 for stopping the alignment film AL1 need not be formed. The groove GR2 includes portions GR21 and GR22 extending in the second direction Y, and portions GR23 and GR24 extending in the first direction X. The portions GR21 and GR22 are connected to the portions GR23 and GR24, respectively.

FIG. 14 is a cross section showing a modified example of the display panel PNL according to the second embodiment shown in FIG. 12. The structure shown in FIG. 14 is different from that of FIG. 12 in that a peripheral electrode (first peripheral electrode) PRE1 is disposed under the sealing material SE.

The peripheral electrode PRE1 is located between the sealing material SE and the insulating film 16. The peripheral electrode PRE1 is disposed in the same layer as that of the peripheral wire WR3 and the pixel electrode, and is formed from a material identical to that of these members. With the peripheral electrode PRE1 disposed under the sealing material SE, the adhesion strength of the sealing material SE can be enhanced, and the electric field from the peripheral wire WR1 can be shielded.

With this configuration, an advantageous effect similar to that of the example shown in FIG. 12 can be obtained.

Figure 15:
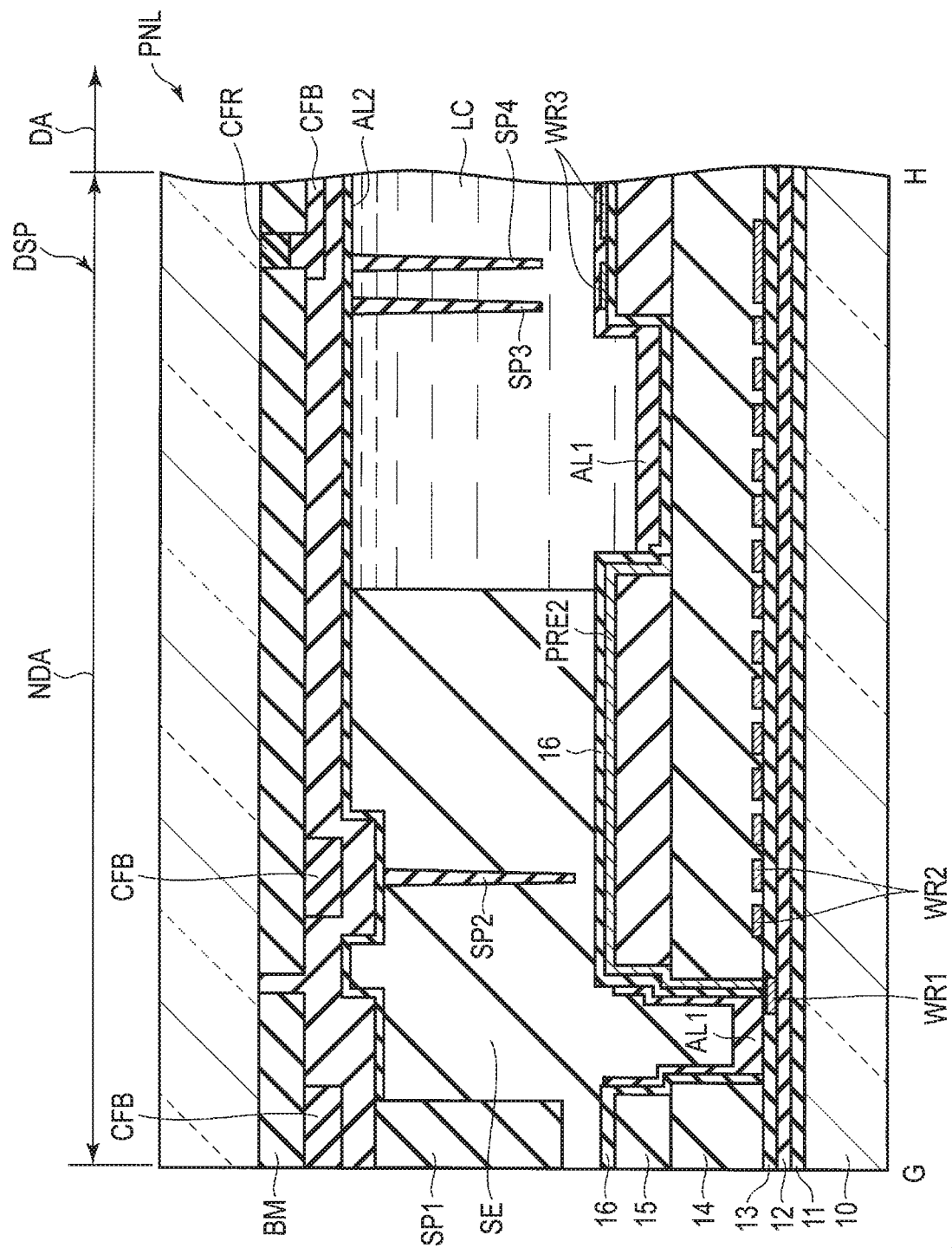
FIG. 15 is a cross section showing a modified example of the display panel according to the second embodiment shown in FIG. 12.

FIG. 15 is a cross section showing a modified example of the display panel PNL according to the second embodiment shown in FIG. 12. The structure shown in FIG. 15 is different from that of FIG. 12 in that the peripheral electrode (second peripheral electrode) PRE2 is disposed in a position overlapping the sealing material SE.

The peripheral electrode PRE2 is disposed on the insulating film 15, and is covered by the insulating film 16. The peripheral electrode PRE2 is disposed in the same layer as that of the common electrode, the first transparent electrode and the second transparent electrode, and is formed from a material identical to that of these members. With the peripheral electrode PRE2 disposed in the position overlapping the sealing material SE, the adhesion strength of the sealing material SE can be enhanced and the electric field from the peripheral wire WR1 can be shielded.

With this configuration, an advantageous effect similar to that of the example shown in FIG. 12 can be obtained.

Figure 16:
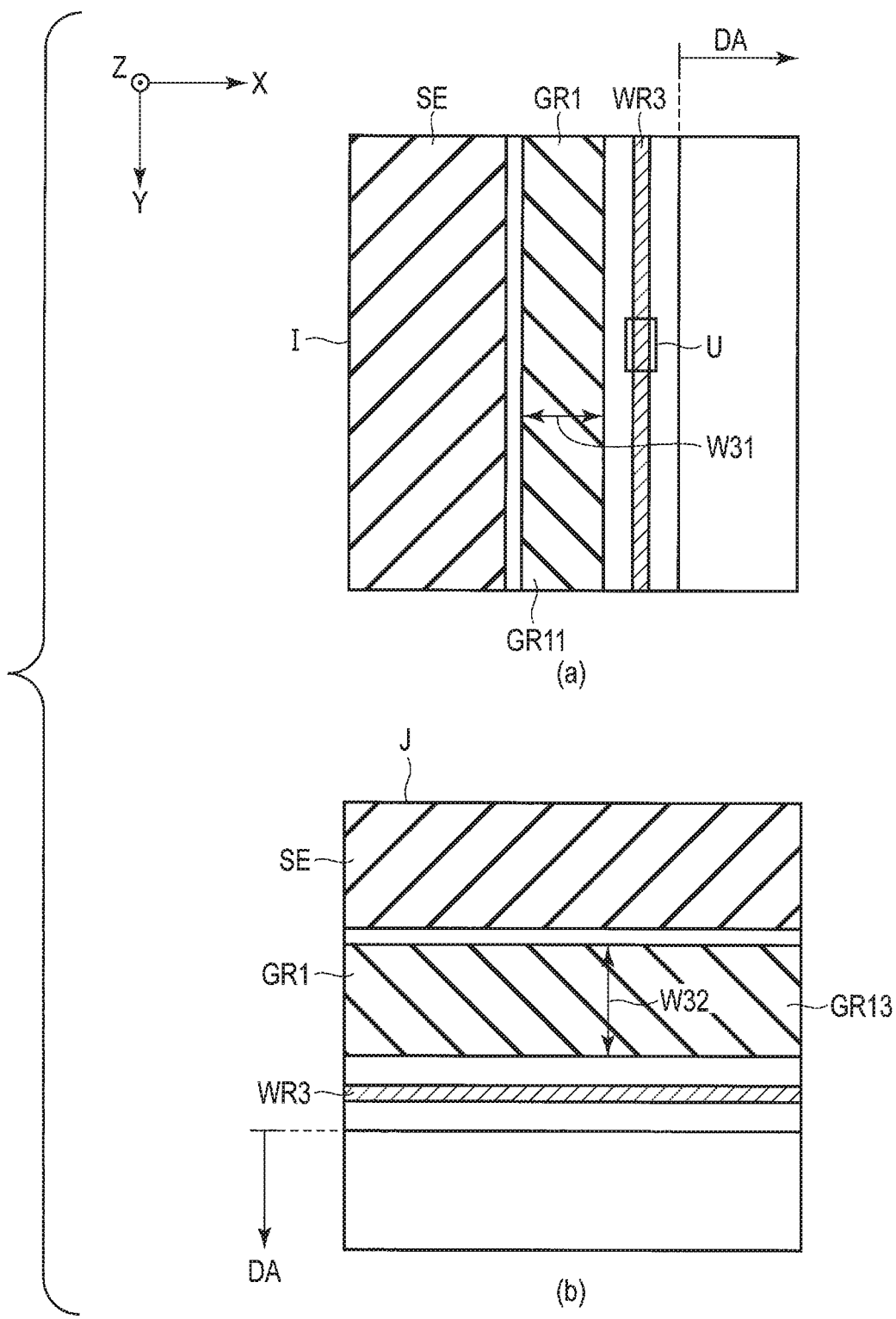
FIG. 16 is an enlarged view of a region I and a region J shown in FIG. 13.

FIG. 16 is an enlarged view of a region I and a region J shown in FIG. 13.

FIG. 16, part (a) shows an enlarged view of the region I. The portion GR11 of the groove GR1 has a width W31 along the first direction X. The width W31 is about 150 µm. The portion GR12 shown in FIG. 13 has a width similar to that of the portion GR11. The peripheral wire WR3 extends in the second direction Y between the portion GR11 and the display area DA.

FIG. 16, part (b) shows an enlarged view of the region J. The portion GR13 has a width W32 along the second direction Y. The width W32 is greater than the width W31. The width W32 is about 350 µm. The peripheral wire WR3 extends in the first direction X between the portion GR13 and the display area DA.

As described above, according to the second embodiment, a display device which can suppress degradation of the reliability can be provided.

Next, a display device according to a third embodiment will be explained in detail.

Figure 17:
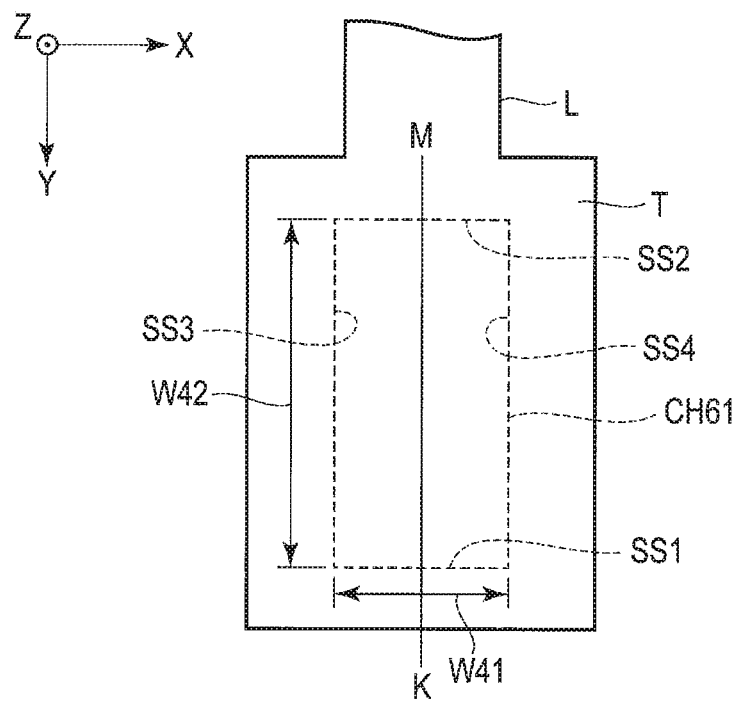
FIG. 17 is a plan view showing a comparative example of a terminal portion of the sensor wiring shown in FIG. 2.

FIG. 17 is a plan view showing a comparative example of the terminal portion T of the sensor wire L shown in FIG. 2.

A through-hole CH61 is located in a region overlapping the terminal portion T. The through-hole CH61 has a width W41 along the first direction X, and a width W42 along the second direction Y. For example, the width W41 is about 5 µm, and the width W42 is about 10 µm. The through-hole CH61 comprises side surfaces SS1 to SS4.

Figure 18:
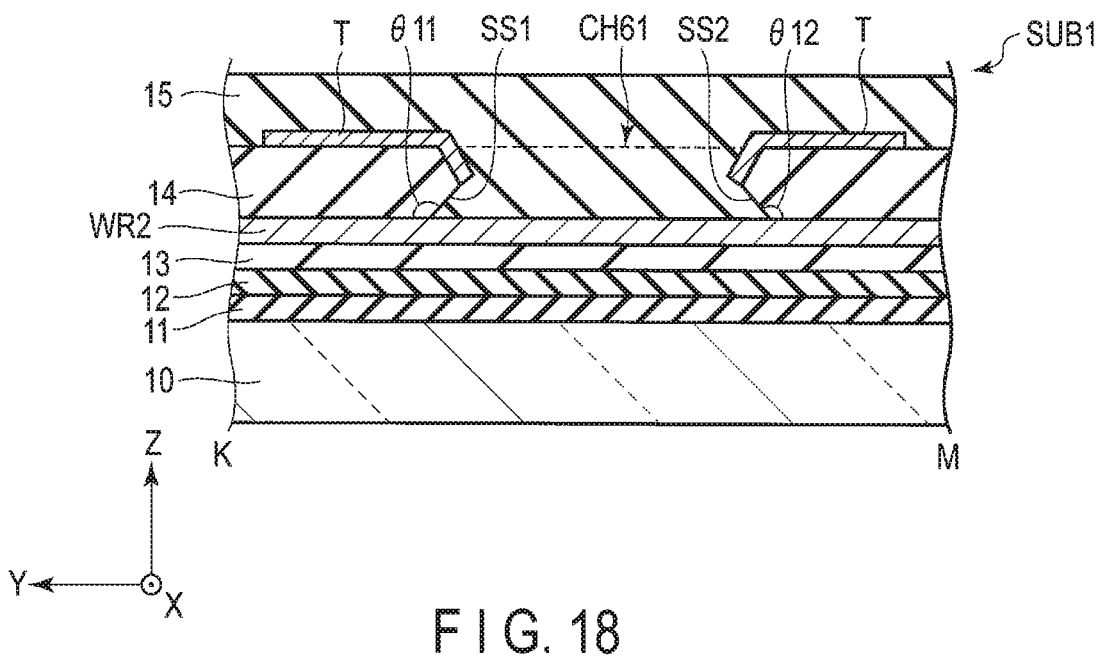
FIG. 18 is a cross-sectional view of the first substrate taken along line K-M in FIG. 17.

FIG. 18 is a cross-sectional view of the first substrate SUB1 taken along line K-M in FIG. 17.

The through-hole CH61 penetrates the insulating film 14 to the peripheral wire WR2. In the comparative example shown in FIG. 18, an angle θ11 between the side surface SS1 and the peripheral wire WR2 and an angle θ12 between the side surface SS2 and the peripheral wire WR2 are greater than 90°. With this structure, the terminal portion T cannot follow up the side surfaces SS1 and SS2, but is disconnected. Note that this is also the case for the side surfaces SS3 and SS4 shown in FIG. 17.

Figure 19:
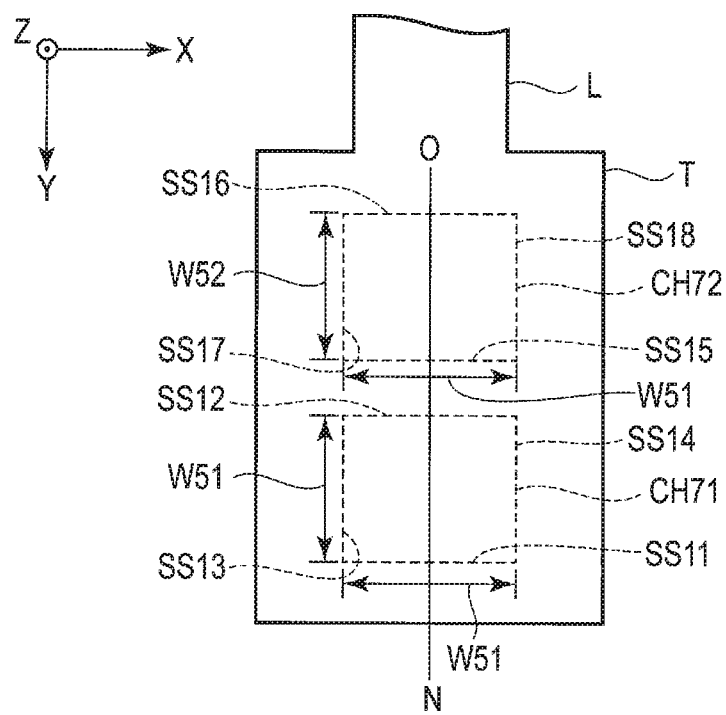
FIG. 19 is a plan view showing a terminal portion according to the third embodiment.

FIG. 19 is a plan view showing a terminal portion T according to the third embodiment. The structure shown in FIG. 19 is different from that of FIG. 17 in that a through-hole (seventh through-hole) CH71 and a through-hole (eighth through-hole) CH72 are different from that in width.

The through-holes CH71 and CH72 are located in a region overlapping the terminal portion T. The through-holes CH71 and CH72 each have a width W51 along the first direction X and a width W52 along the second direction Y. The width W51 is less than the width W41 of the through-hole CH61 shown in FIG. 17, and the width W52 is less than the width W42. For example, the width W51 and the width W52 are each about 3.5 μm. The through-hole CH71 comprises side surfaces SS11 to SS14, and the through-hole CH72 comprises side surfaces SS15 to SS18.

In this embodiment, the width W51 is approximately equal to the width of the through-hole CH11 along the first direction X shown in FIG. 10, and the width W52 is approximately equal to the width of the through-hole CH11 along the second direction Y.

Figure 20:
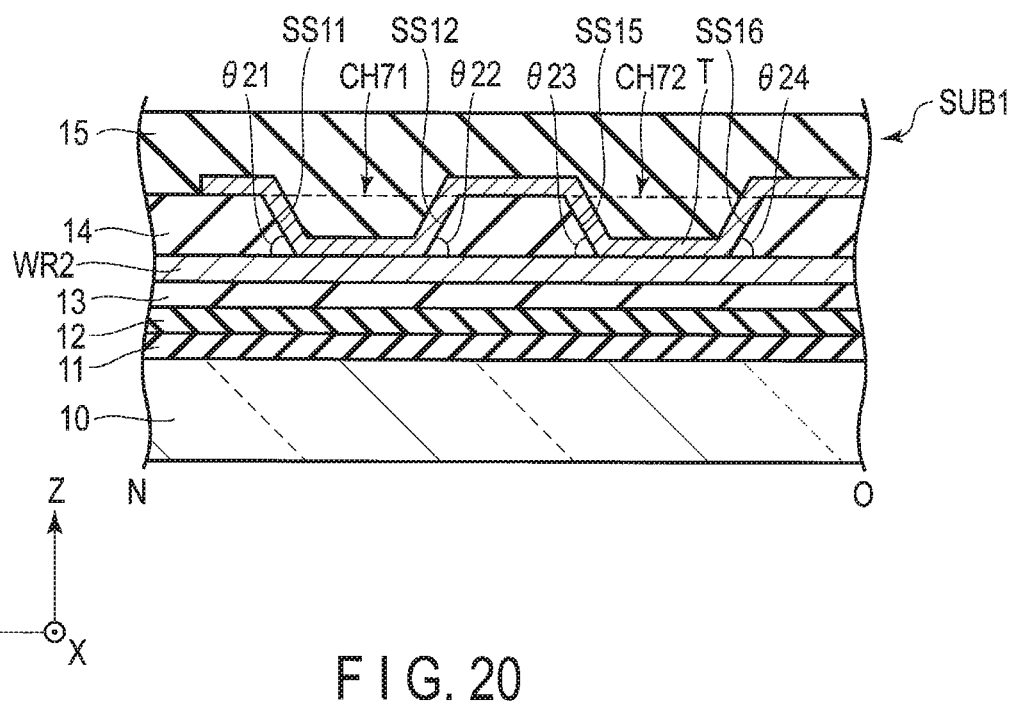
FIG. 20 is a cross-sectional view of the first substrate taken along line N-O in FIG. 19.

FIG. 20 is a cross-sectional view of the first substrate SUB1 taken along line N-O shown in FIG. 19.

The through-holes CH71 and CH72 penetrate the insulating film 14 to the peripheral wire (the first peripheral wire) WR2. In the third embodiment, the angle θ21 between the side surface SS11 and the peripheral wire WR2, the angle θ22 between the side 12 and the peripheral wire WR2, the angle θ23 between the side surface SS15 and the peripheral wire WR2, and the angle θ24 between the side surface SS16 and the peripheral wire WR2 are 90° or less. With this configuration, the terminal portion T follows the side surface SS11, SS12, SS15 and SS16, and is electrically connected to the peripheral wire WR2 in the through-holes CH71 and CH72. Nota that this is also the case for the side surfaces SS13, SS14, SS17 and SS18 shown in FIG. 19.

Thus, the width of the through-holes CH71 and CH72 which overlap the terminal portion T is set equivalent to the width of the through-hole CH21 of the display area DA, and therefore disconnection of the terminal portion T can be inhibited.

In the example illustrated, two through-holes CH71 and CH72 are formed in the region which overlaps the terminal portion T, but the number of through-holes may be one or three or more.

FIG. 21 is a plan view showing a comparative example of the peripheral wire WR3 in the region U shown in FIG. 16.

Through-holes CH81 and CH82 are located in the region which overlaps the peripheral wire WR3 and the metal electrode ME. The through-hole CH81 comprises a width W61 along the first direction X, and a width W62 along the second direction Y. The through-hole CH82 comprises a width W71 along the first direction X, and a width W72 along the second direction Y. For example, the width W61 and the width W71 are approximately the same and each are about 5 μm, and the width W62 and the width W72 are approximately the same and each are about 10 μm. The through-hole CH81 comprises side surfaces SS21 to SS24. The through-hole CH82 comprises side surfaces SS25 to SS28.

FIG. 22 is a cross-sectional view of the first substrate SUB1 taken along line P-Q shown in FIG. 21.

The metal electrode ME is located between the insulating film 14 and the insulating film 15. The through-hole CH81 penetrates the insulating film 14 to the peripheral wire WR2. The through-hole CH82 penetrates the insulating film 15 to the metal electrode ME. In the through-hole CH81, an angle θ31 between the side surface SS21 and the peripheral wire WR2 and an angle θ32 between the side surface SS22 and the peripheral wire WR2 are greater than 90°. Thus, the metal electrode ME cannot follow up the side surfaces SS21 and SS22, but is disconnected. Note that this is also the case for the side surfaces SS23 and SS24 shown in FIG. 21. In the through-hole CH82, an angle θ33 between the side surface SS25 and the metal electrode ME and an angle θ34 between the side surface SS26 and the metal electrode ME are greater than 90°. Thus, the peripheral wire WR3 can follow up the side surfaces SS25 and SS26, but is disconnected. Note that this is also the case for the side surfaces SS27 and SS28 shown in FIG. 21.

Figure 23:
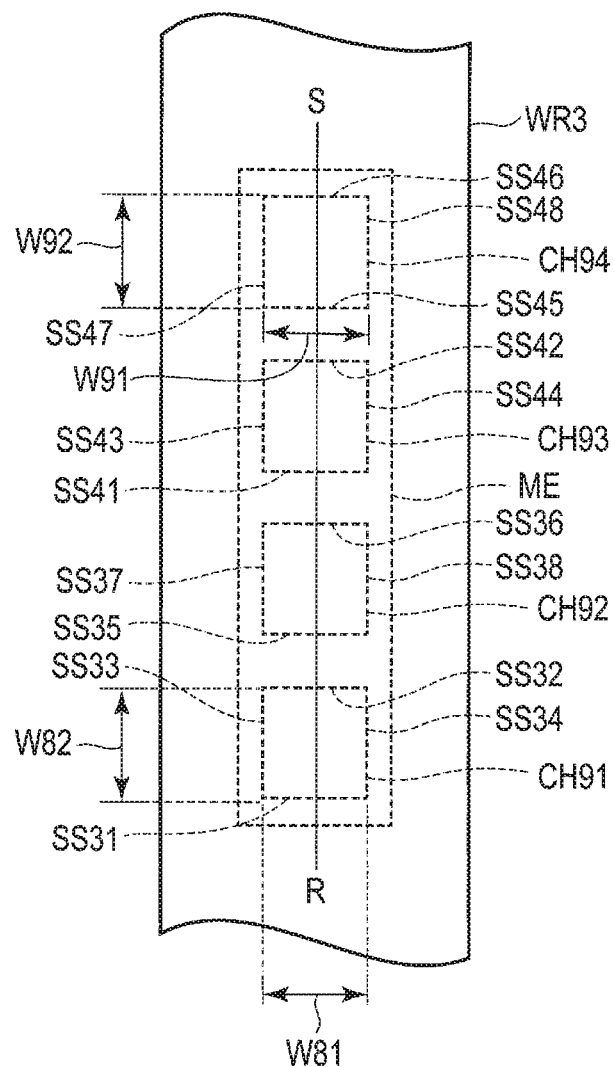
FIG. 23 is a plan view showing the region U of the peripheral wire according to the third embodiment.

FIG. 23 is a plan view showing the region U of the peripheral wire WR3 according to the third embodiment. The structure shown in FIG. 23 is different from that of FIG. 21 in that a through-hole (ninth through-hole) CH91, a through-hole CH92, a through-hole (tenth through-hole) CH93 and through-hole CH94 are different from those in width.

The through-holes CH91 to CH94 are located in a region which overlaps the peripheral wire (second peripheral wire) WR3 and the metal electrode (third metal electrode) ME. The through-holes CH91 and CH92 have a width W81 along the first direction X, and a width W82 along the second direction Y. The width W81 is less than the width W61 of the through-hole CH81 shown in FIG. 21, and the width W82 is less than the width W62. For example, the width W81 and the width W82 each are about 3.5 μm. The through-holes CH93 and CH94 have a width W91 along the first direction X, and a width W92 along the second direction Y. The width W91 is less than the width W71 of the through-hole CH82 shown in FIG. 21, and the width W92 is less than the width W72. For example, the width W91 and the width W92 each are about 4 μm. The through-hole CH91 comprises side surfaces SS31 to SS34, and the through-hole CH92 comprises side surfaces SS35 to SS38. The through-hole CH93 comprises side surfaces SS41 to SS44, and the through-hole CH94 comprise side surfaces SS45 to SS48.

In this embodiment, the width W81 is approximately equal to the width of the through-hole CH11 along the first direction X shown in FIG. 10, and the width W82 is approximately equal to the width of the through-hole CH11 along the second direction Y. Further, the width W91 is approximately equal to the width of the through-hole CH21 along the first direction X shown in FIG. 11, and the width W92 is approximately equal to the width of the through-hole CH21 along the second direction Y.

Figure 24:
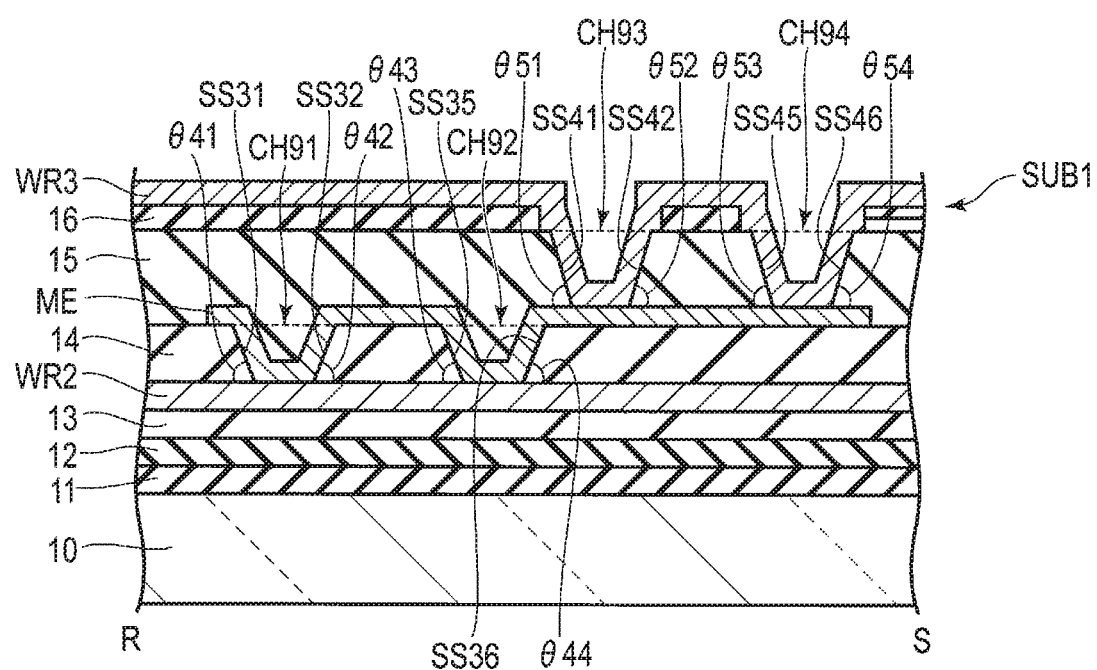
FIG. 24 is a cross-sectional view of the first substrate taken along line R-S in FIG. 23.

FIG. 24 is a cross-sectional view of the first substrate SUB1 taken along line S-R shown in FIG. 23.

The through-holes CH91 and CH92 penetrate the insulating film 14 to the peripheral wire WR2. In the third embodiment, an angle θ41 between the side surface SS31 and the peripheral wire WR2, an angle θ42 between the side surface SS32 and the peripheral wire WR2, an angle θ43 between the side surface SS35 and the peripheral wire WR2, and an angle θ44 between the side surface SS36 and the peripheral wire WR2 are 90° or less. Therefore, the metal electrode ME follows up the side surface SS31, SS32, SS35 and SS36, and is electrically connected to the peripheral wire WR2 in the through-holes CH91 and CH92. Note that this is also the case for the side surface SS33, SS34, SS37, and SS38 shown in FIG. 23.

The through-holes CH93 and CH94 penetrate the insulating film 15 to the metal electrode ME. In the third embodiment, an angle θ51 between the side surface SS41 and the metal electrode ME, an angle θ52 between the side surface SS42 and the metal electrode ME, an angle θ53 between the side surface SS45 and the metal electrode ME, and an angle θ54 between the side surface SS46 and the metal electrode ME are 90° or less. Thus, the peripheral wire WR3 follows up the side surfaces SS41, SS42, SS45 and SS46, and is electrically connected to the metal electrode ME in the through-holes CH93 and CH94. Note that this is also the case for the side surface SS43, SS44, SS47 and SS48 shown in FIG. 23.

Thus, the width of the through-holes CH91 and CH92 which overlap the peripheral wire WR3 is set equal to the width of the through-hole CH11 of the display area DA and the width of the through-holes CH93 and CH94 is set equal to the width of the through-hole CH21 of the display area DA, and therefore disconnection of the metal electrode ME and the peripheral wire W3 can be inhibited.

In the example illustrated, two through-holes CH91 and CH92 are formed to penetrate the insulating film 14 in the region which overlaps the metal electrode ME, but the number of through-holes which penetrate the insulating film 14 may be one or three or more. Similarly, two through-holes CH93 and CH94 are formed to penetrate the insulating film 15 in the region which overlaps the metal electrode ME, but the number of through-holes which penetrate the insulating film 15 may be one or three or more.

As described above, according to the third embodiment, a display device which can suppress lowering of the production yield can be provided.

Note that the main structure disclosed in the first and third embodiments can be applied to spontaneous light-emitting display devices comprising an organic electroluminescence display element or the like, electronic paper type display devices comprising an electrophoretic element or the like, display devices adapting micro-electromechanical systems (MEMS), display device adapting electrochromism or the like. Moreover, the main structure disclosed in the second embodiment is applicable to liquid crystal display devices.

Further, the expression "approximately equal" used in this specification is used in consideration of the error which may occur in the manufacturing process. For example, it is assumed that the widths of the through-holes are those measured at a height location common to a height from the lower bottom to the upper bottom of each through-hole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a switching element comprising a first drain electrode;
    a first insulating film comprising a first through-hole penetrating to the first drain electrode and formed of an organic insulating material;
    a first metal electrode in contact with the first drain electrode in the first through-hole and formed of a metal material;
    a second insulating film located on the first insulating film, comprising a second through-hole penetrating to the first metal electrode, and formed of an organic insulating material;
    a first transparent electrode in contact with the first metal electrode in the second through-hole and formed of a transparent conductive material;
    a third insulating film located on the second insulating film, comprising a third through-hole penetrating to the first transparent electrode and formed of an inorganic insulating material;
    a pixel electrode located on the third insulating film and in contact with the first transparent electrode in the third through-hole;
    a metal wire located between the first insulating film and the second insulating film and formed of a material identical to that of the first metal electrode;
    a first common electrode and a second common electrode, formed of a material identical to that of the first transparent electrode; and
    a bridge portion located between the first common electrode and the second common electrode, and electrically connecting the first common electrode and the second common electrode to each other,
    wherein
    the metal wire comprises a line portion and a pedestal portion which overlaps the bridge portion,
    the pedestal portion has a width greater than a width of the line portion,
    the second insulating film comprises a fourth through-hole in a position which overlaps the pedestal portion, and
    the bridge portion is in contact with the pedestal portion in the fourth through-hole.

2. The display device of claim 1, wherein
    the first drain electrode, the first metal electrode, the first transparent electrode and the pixel electrode are stacked one on another in this order in the first through-hole, thus forming a first stacked layer, and
    the first drain electrode, the first metal electrode, the first transparent electrode, the third insulating film and the pixel electrode are stacked one on another in this order in the first through-hole, thus forming a second stacked layer.

3. The display device of claim 1, wherein
    the second insulating film comprises an end portion located between the first metal electrode and the first transparent electrode, and
    the pixel electrode is in contact with the first transparent electrode immediately above the end portion.

4. The display device of claim 1, wherein
    the first common electrode and the second common electrode form a sensor electrode to which touch drive voltage is applied in a touch sensing mode.

5. The display device of claim 1, further comprising:
    a signal line electrically connected to the switching element and formed of a material identical to that of the first drain electrode,
    wherein
    the metal wire is located immediately above the signal line.

6. The display device of claim 1, further comprising:
    a light-shielding layer comprising a first portion extending in a first direction and a second portion extending in a second direction which crosses the first direction,
    wherein
    the first portion has a width greater than that of the second portion, and
    the pedestal portion and the fourth through-hole overlap the first portion.

7. The display device of claim 6, further comprising:
    a second drain electrode arranged along in the first direction of the first drain electrode;
    a second metal electrode in contact with the second drain electrode in a fifth through-hole which penetrates the first insulating film to the second drain electrode; and a second transparent electrode in contact with the second metal electrode in a sixth through-hole which penetrates the second insulating film to the second metal electrode, wherein the pedestal portion and the fourth through-hole are located between the first metal electrode and the second metal electrode.

8. The display device of claim 7, wherein the first common electrode and the second common electrode are arranged along the second direction, the first transparent electrode and the second transparent electrode are arranged along the first direction between the first common electrode and the second common electrode, and the bridge portion is located between the first transparent electrode and the second transparent electrode.

9. The display device of claim 7, wherein the first metal electrode has a first width on a side of the pedestal portion with respect to the first through-hole, and a second width on an opposite side to the pedestal portion with respect to the first through-hole, the second width is larger than the first width, the second metal electrode has a third width on a side of the pedestal portion with respect to the fifth through-hole, and a fourth width on an opposite side to the pedestal portion with respect to the fifth through-hole, and the fourth width is greater than the third width.

10. The display device of claim 7, wherein the first transparent electrode has a fifth width on a side of the bridge portion with respect to the second through-hole, and a sixth width on an opposite side to the bridge portion with respect to the second through-hole, the sixth width is larger than the fifth width, the second transparent electrode has a seventh width on a side of the bridge portion with respect to the sixth through-hole, and an eighth width on an opposite side to the bridge portion with respect to the sixth through-hole, the eighth width is larger than the seventh width.

11. The display device of claim 1, further comprising:

a display area and a non-display area surrounding the display area;

a first substrate including the first metal electrode, the first transparent electrode, the metal wire, the first insulating film, the second insulating film, the third insulating film and the pixel electrode, and comprising an alignment film which covers the pixel electrode and the third insulating film, and a groove portion which penetrates the second insulating film to the first insulating film in the non-display area;

a second substrate opposing the first substrate;

a sealing material which adheres the first substrate and the second substrate; and a liquid crystal layer surrounded by the first substrate, the second substrate and the sealing material, wherein the groove portion is located on a side of the display area with respect to the sealing material.

12. The display device of claim 11, wherein the groove portion has a width of 100 μm or more.

13. The display device of claim 12, wherein the sealing material is in contact with the third insulating film.

14. The display device of claim 12, further comprising:

a first peripheral electrode located between the sealing material and the third insulating film, and formed of a material identical to that of the pixel electrode.

15. The display device of claim 12, further comprising a second peripheral electrode located between the second insulating film and the third insulating film in a region which overlaps the sealing material, and formed of a material identical to that of the first transparent electrode.

16. The display device of claim 1, further comprising: a display area and a non-display area surrounding the display area; and a first peripheral wire located in the non-display area, wherein the metal wire comprises a terminal portion in contact with the first peripheral wire in a seventh through-hole that penetrates the first insulating film to the first peripheral wire, the seventh through-hole has a width along a first direction that is substantially the same as a width of the first through-hole along the first direction, and the seventh through-hole has a width along a second direction crossing the first direction that is substantially the same as a width of the first through-hole along the second direction.

17. The display device of claim 16, wherein the first insulating film comprises an eighth through-hole which penetrates to the first peripheral wire in a position which overlaps the terminal portion, the terminal portion is in contact with the first peripheral wire in the eighth through-hole, the eighth through-hole has a width along the first direction that is substantially the same as a width of the seventh through-hole along the first direction, and the eighth through-hole has a width along the second direction that is substantially the same as a width of the seventh through-hole along the second direction.

18. The display device of claim 1, further comprising: a display area and a non-display area surrounding the display area; a first peripheral wire located in the non-display area; a second peripheral wire located on the third insulating film and overlapping the first peripheral wire; and a third metal electrode disposed between the first insulating film and the second insulating film in a position which overlaps the first peripheral wire and the second peripheral wire, wherein the third metal electrode is in contact with the first peripheral wire in the ninth through-hole which penetrates the first insulating film to the first peripheral wire, a ninth through-hole has a width along the first direction that is substantially the same as a width of the first through-hole along the first direction, and the ninth through-hole has a width along a second direction crossing the first direction that is substantially the same as a width of the first through-hole along the second direction.

19. The display device of claim 18, wherein the second peripheral wire is in contact with the third metal electrode in a tenth through-hole that penetrates the second insulating film to the third metal electrode, the tenth through-hole has a width along the first direction that is substantially the same as a width of the second through-hole along the first direction, and the tenth through-hole has a width along the second direction that is substantially the same as a width of the second through-hole along the second direction.

* * * * *